United States Patent [19]
Iwadate et al.

[11] Patent Number: 5,592,305
[45] Date of Patent: Jan. 7, 1997

[54] IMAGE FORMING APPARATUS FOR SYNTHESIZING PLURAL IMAGES

[75] Inventors: Masahiro Iwadate, Yokohama; Yoshihiko Suzuki, Tokyo; Hideto Kohtani, Yokohama; Satoru Kutsuwada; Shokyo Koh, both of Kawasaki; Ken Kuroda, Yokohama, all of Japan

[73] Assignee: Canon Kabushiki Kaisha, Tokyo, Japan

[21] Appl. No.: 276,787

[22] Filed: Jul. 18, 1994

[30] Foreign Application Priority Data

Jul. 23, 1993 [JP] Japan ................................. 5-202602

[51] Int. Cl.$^6$ ........................... H04N 1/387; H04N 1/393
[52] U.S. Cl. ..................... 358/448; 358/450; 358/451; 358/462
[58] Field of Search ........................... 358/450, 448, 358/462, 534–539, 468, 437, 451; 395/135, 102; 382/284; 348/585, 584, 589, 596, 597, 598, 586, 239

[56] References Cited

U.S. PATENT DOCUMENTS

| | | | |
|---|---|---|---|
| 4,672,459 | 6/1987 | Kudo | 358/462 |
| 5,032,928 | 7/1991 | Sakai | 358/450 |
| 5,396,345 | 3/1995 | Motoyama | 358/450 |

*Primary Examiner*—Scott A. Rogers
*Assistant Examiner*—Kevin L. Chapple
*Attorney, Agent, or Firm*—Fitzpatrick, Cella, Harper & Scinto

[57] ABSTRACT

An synthetic-image forming apparatus including: an interface for inputting image information from a computer; a scanner for inputting original document image information; an operation portion for inputting region information indicating a region in which images are synthesized; an operation portion for selecting a printer base mode in which the image information from the interface is synthesized onto outside of the region and image information from the scanner is synthesized onto inside of the region or a scanner base mode in which the image information from the interface is synthesized onto inside of the region and the image information from the scanner is synthesized onto outside of the region; image forming portion for synthesizing the image information from the interface and the image information from the scanner in accordance with the mode selected by the operation portion and the region information supplied from the operation portion and forming an image on a selected sheet in accordance with the synthesized image information; and a control portion that inhibits an image forming operation of the image forming portion if image size included in the image information supplied from the interface and size of the selected sheet do not coincide with each other in the printer base mode and that permits the image forming portion to start the image forming operation if the image size of the image information supplied from the interface and the size of the selected sheet do not coincide with each other in the scanner base mode.

16 Claims, 19 Drawing Sheets

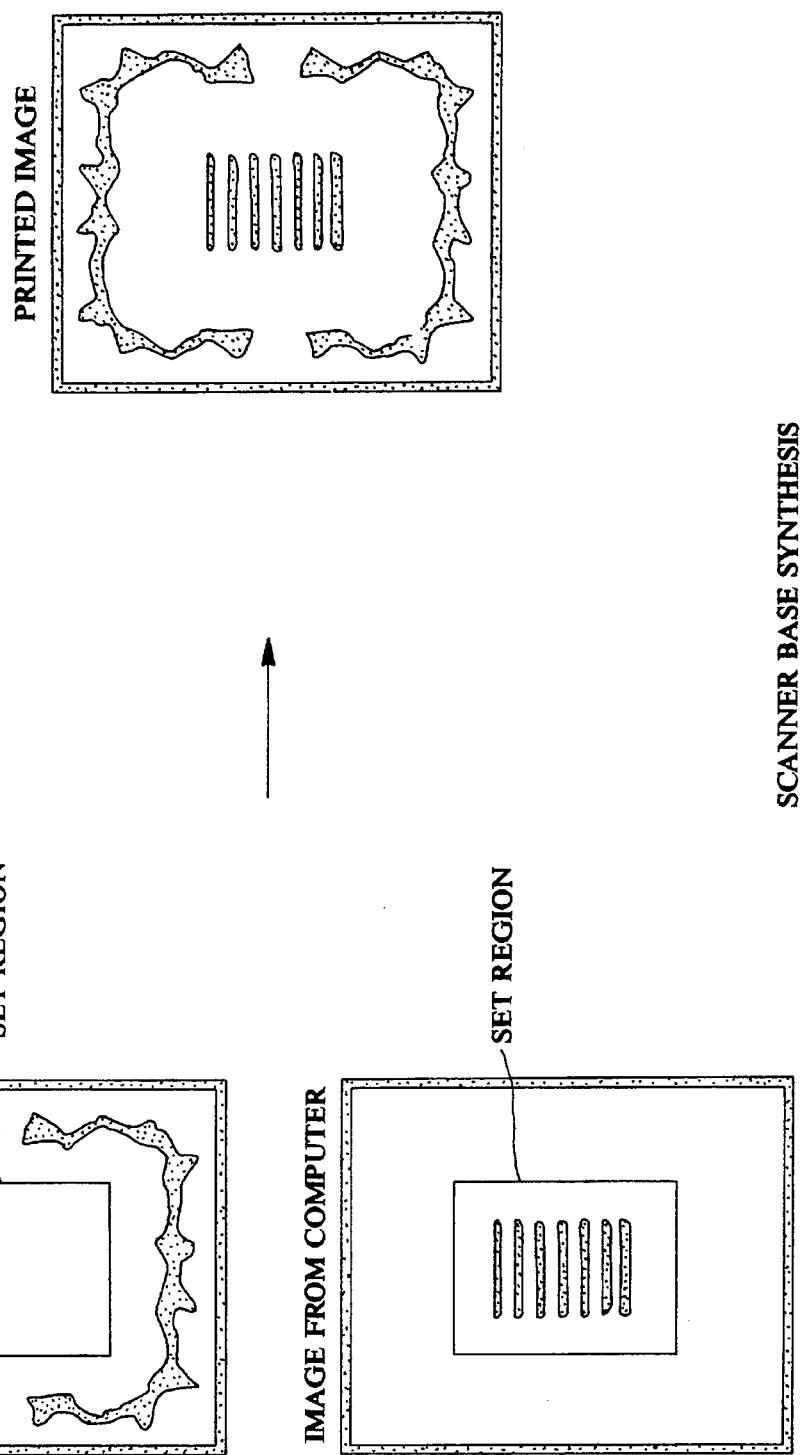

IMAGE FORMING APPARATUS FOR SYNTHESIZING PLURAL IMAGES

BACKGROUND OF THE INVENTION

1. Field of the Invention

The present invention relates to an image forming apparatus that synthesizes images supplied from a plurality of apparatuses to form a synthesized image on one sheet.

2. Description of the Prior Art

Recently, there has been suggested an image forming apparatus that comprises a digital image processing portion including a scanner portion and a printer portion and that is connected to an external unit so as to be capable of forming a composite image.

In an apparatus of the foregoing type, if the size of an output image and the size of recording paper, which can be supplied from the printer portion, do not coincide with each other when image information supplied from the external unit is outputted from the printer portion, the foregoing case is always treated as an error.

However, an operation of a type in which an image supplied from an external unit and an image supplied from a scanner portion are synthesized in an appointed region so as to be outputted, sometimes encounters a problem that their sizes do not coincide with each other.

In a case where an image supplied from the scanner portion is used as a base, the size of the paper corresponding to the foregoing image is instructed by an operator. Even if the size of an image from the external unit and the size of the paper do not coincide with each other, the foregoing case cannot always be considered as an error.

Therefore, if a case of the foregoing type in which the sizes of the images do not coincide with each other is discriminated to be an error, a user must perform a complicated process to synthesize and process desired images in such a way that the size of an image supplied from an external unit, the size of an image supplied from a scanner and the size of the paper are previously matched. Thus, there arises a problem for the user to perform an excessively complicated work.

SUMMARY OF THE INVENTION

An object of the present invention is to provide an image forming apparatus capable of overcoming the foregoing problem.

Another object of the present invention is to provide an image forming apparatus capable of synthesizing images from a plurality of apparatuses with a simple operation.

Another object of the present invention is to provide an image forming apparatus capable of handling disagreement of sizes of a plurality of synthesized images.

Other and further objects, features and advantages of the invention will be appear more fully from the following description.

BRIEF DESCRIPTION OF THE DRAWINGS

FIGS. 10(a) and 10(b) respectively illustrate scanner base synthesis and printer base synthesis;

DESCRIPTION OF THE PREFERRED EMBODIMENTS

Figure 1:
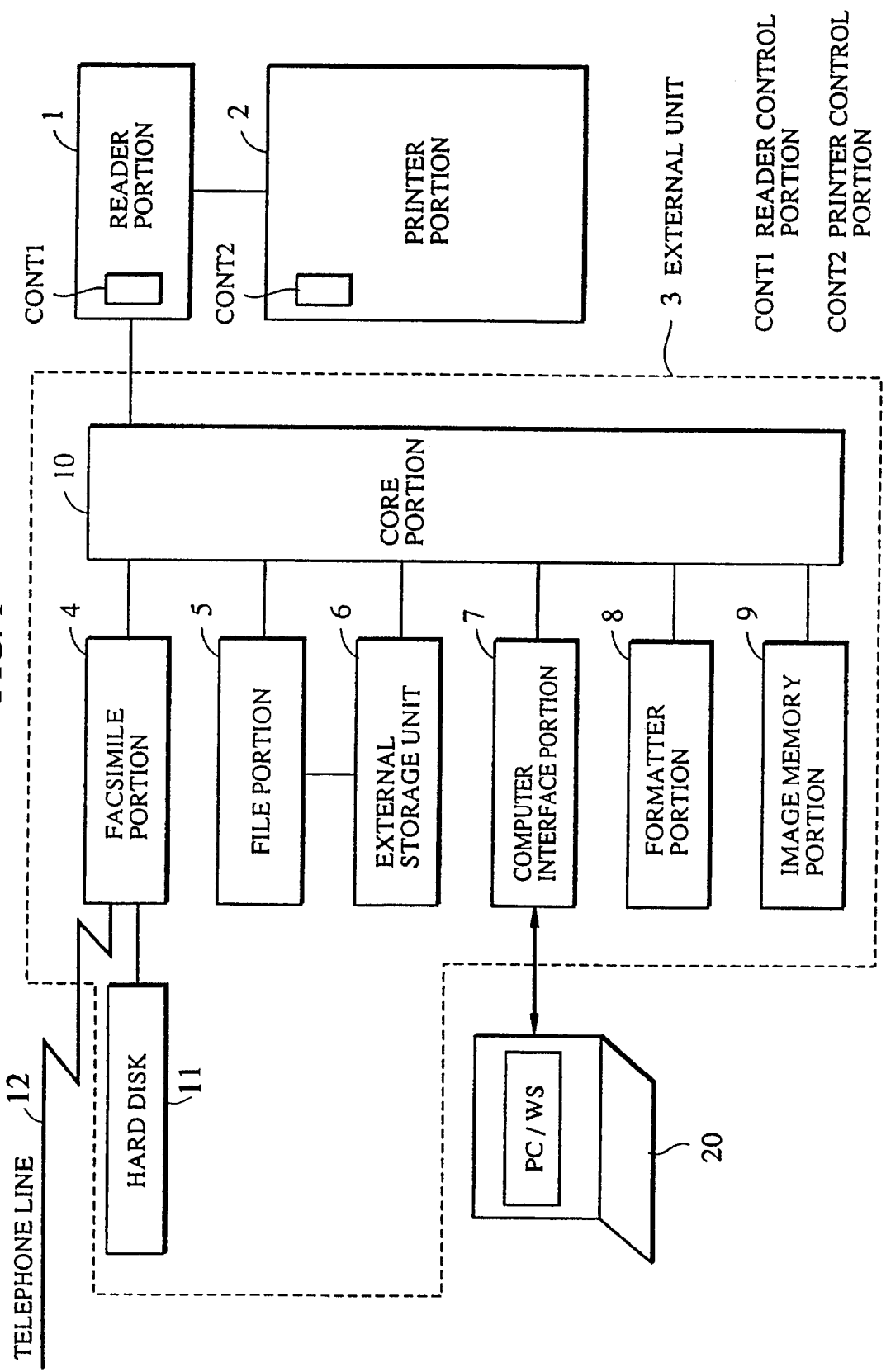
FIG. 1 is a block diagram which illustrates the structure of a synthetic-image forming apparatus according to an embodiment of the present invention.

FIG. 1 is a block diagram illustrating the structure of a synthetic-image forming apparatus according to an embodiment of the present invention.

Referring to FIG. 1, reference numeral 1 represents a reader portion serving as a first image input means to convert the image of an original document into image data. Reference numeral 2 represents a printer portion serving as an image output means and having plural types of recording paper cassettes so as to output image data as a visible image onto the recording paper in accordance with a printing command. Reference numeral 3 represents an external unit electrically connected to the reader portion 1, the external unit having a variety of functions. That is, the external unit 3 serving as a second image input means comprises a facsimile portion 4 having a hard disk 11 and a telephone line 12 associated therewith, a file portion 5, an external storage unit 6 connected to the file portion 5, a computer interface portion 7 for establishing the connection with a computer 20 and a LAN (omitted from illustration), a formatter portion 8 for visualizing information supplied from the computer 20, an image memory portion 9 for storing information supplied from the reader portion 1 and temporarily storing information supplied from the computer 20, and a core portion 10 for controlling the foregoing functions. Note that the core portion 10 also serves as a means for synthesizing images. CONT 1 serving as a reader control portion and CONT 2 serving as a printer control portion are made to be capable of communicating with each other and with the core portion 10, CONT 1 and CONT 2 comprising known CPU, ROM and RAM.

In the thus-constituted synthetic-image forming apparatus, when a synthetic region appointment state is realized by a region appointing means (a key in a control portion or a digitizer that is provided as an option and that can be connected to the synthetic-image forming apparatus), an external image read from the storage means (the external storage unit 6 or the image memory portion 9) or an image of an original document supplied by the image input means (the reader portion 1) is selected by a selection means (the core portion 10). In accordance with the external image read from the selected storage means or the image of the original document supplied by the image input means, a synthetic image can be outputted onto the recording medium by the image output means.

The region appointing means selects either of a first image selection mode for selecting image of an original document/ an external image to correspond to the inside/the outside of the synthesized region appointed by the region appointing means or a second image selection mode for selecting an external image/an image of an original document to correspond to inside/the outside of the synthesized region appointed by the region appointing means. Therefore, images from different image input sources can be outputted to the inside and the outside of the synthesized region, which has been appointed.

If the size of the recording medium appointed by an appointing means (the key in the control portion) and the size of the image of the original document or the external image selected by the selection means (the core portion 10) do not coincide with each other, a notifying means (the core portion 10) notifies the error in selecting the recording medium to the control portion in a case where a discrimination means (the core portion 10) has discriminated the error in selecting the recording medium is valid in accordance with the state of image selection mode appointed by the region appointing means. Therefore, if the size of the recording medium appointed by an appointing means and the size of the image of the original document or the external image selected by the selection means do not coincide with each other, a synthetic image of an image of an original document and an external image can be outputted.

Figure 2:
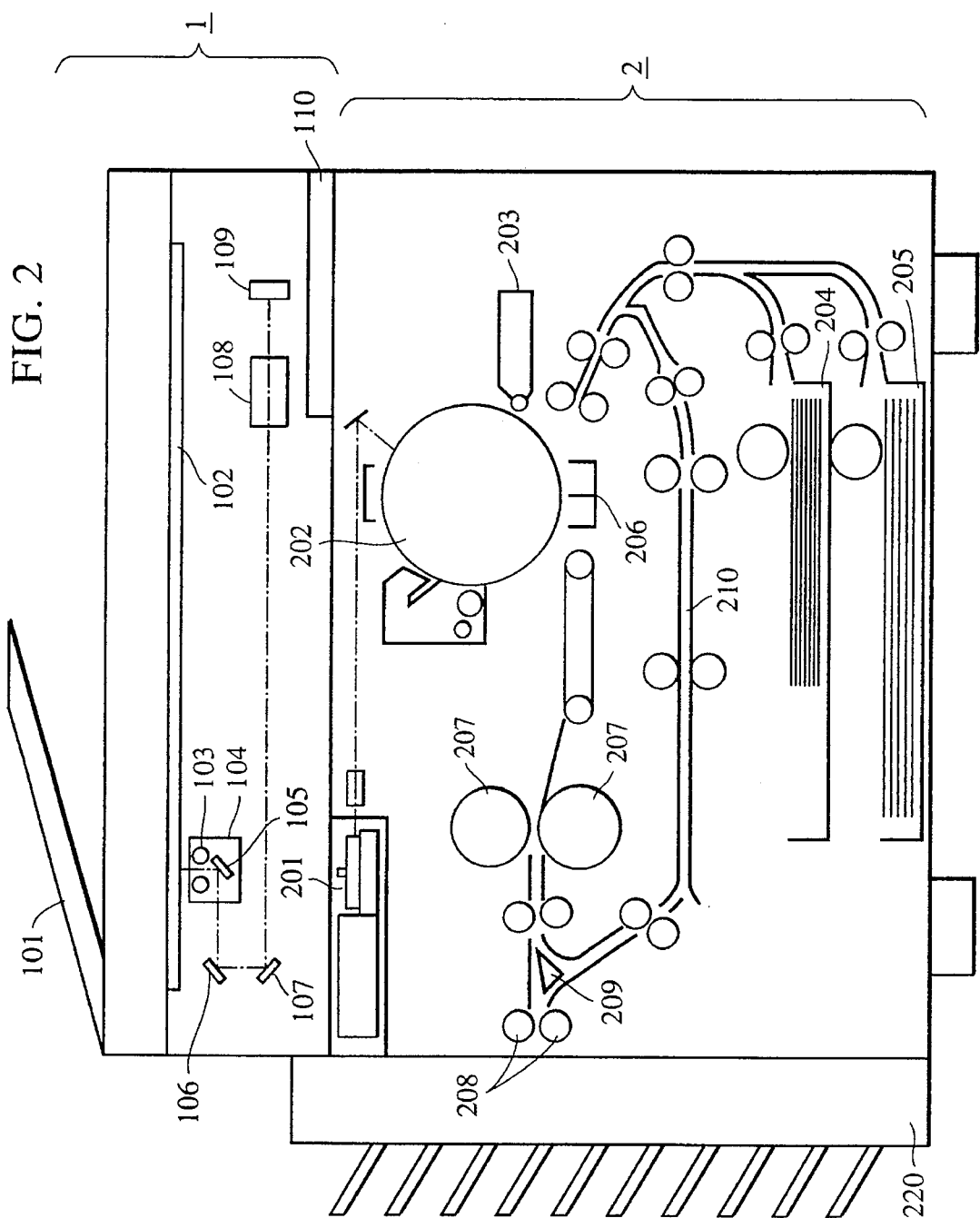
FIG. 2 is a cross sectional view which illustrates the structure of a reader portion 1 and a printer portion 2 shown in FIG. 1.

FIG. 2 is a cross sectional view illustrating the structure of the reader portion 1 and the printer portion 2 shown in FIG. 1. The structure and the operation of them will now be described.

Original document sheets placed on an original document feeding unit 101 are sequentially moved onto an original-document-frame glass surface 102. When the original document has been moved to a predetermined position on the glass surface 102, a lamp 103 of the scanner portion is turned on and the scanner unit 104 is moved so that the original document is irradiated with light. Light reflected from the original document is made incident upon a CCD image sensor 109 (hereinafter called a "CCD") through mirrors 105, 106, 107 and a lens 108.

Light reflected from the original document and received by the CCD 109 is photoelectrically converted. An electric signal obtained by the photoelectric conversion is, in the image processing portion 110, subjected to a variety of image processes. An external switch circuit is a selector for switching a signal supplied from the reader portion 1 to the printer portion 2 or the external unit 3. The selector also has a function of selecting either the signal supplied from the reader portion 1 or that from the external unit 3 to connect it to the printer portion 2.

The electric signal connected to the printer portion 2 by the external switch circuit of the image processing portion 110 is converted into a modulated optical signal by an exposure control portion 201 so as to be used to irradiate a photosensitive member 202. A latent image formed on the photosensitive member 202 due to the irradiation with the light is developed in a developing unit 203. In synchronization with the timing of the leading portion of the latent image, recording paper is conveyed by a recording paper loading portion 204 or a recording paper loading portion 205, and the developed image is transferred to the recording paper by a transferring portion 206. The transferred image is fixed to the recording paper in the fixing portion 207, and then it is discharged to the outside of the apparatus by a paper discharge portion 208. The recording paper outputted from the paper discharge portion 208 is discharged to each bin if a sorting function of a sorter 220 is actuated.

If the sorting function of the sorter 220 is not actuated, it is discharged to the uppermost bin in the sorter 220.

An operation of outputting the images read sequentially onto the two sides of one recording paper will now be described.

The recording paper fixed in the fixing portion 207 is temporarily conveyed to the paper discharge portion 208, and then the direction in which the recording paper is conveyed is reversed so as to be conveyed to a re-paper-feeding recording paper loading portion 210 through a conveyance-direction switch member 209. When a next original document has been prepared, the image of the original document is read similarly to the foregoing process. However, the recording paper is supplied from the re-paper-feeding recording paper loading portion 210, and thus two images of the two original documents are recorded on the two sides of one recording paper.

As shown in FIG. 1, the external unit 3 is connected to the reader portion 1 by the cable, the external unit 3 including the core portion 10 that control signals and various functions. The external unit 3 includes the facsimile portion 4 for transmitting/receiving facsimile information, the file portion 5 for converting various original document information into electric signals to store them in a photomagnetic disk, the formatter portion 8 for developing code information supplied from the computer 20 into image information, the computer interface portion 7 serving as an interface with a LAN (omitted from illustration) and the computer 20, the image memory portion 9 for storing information supplied from the reader portion 1 and temporarily storing information supplied from the computer 20, and the core portion 10 for controlling the foregoing functions.

Figure 3:
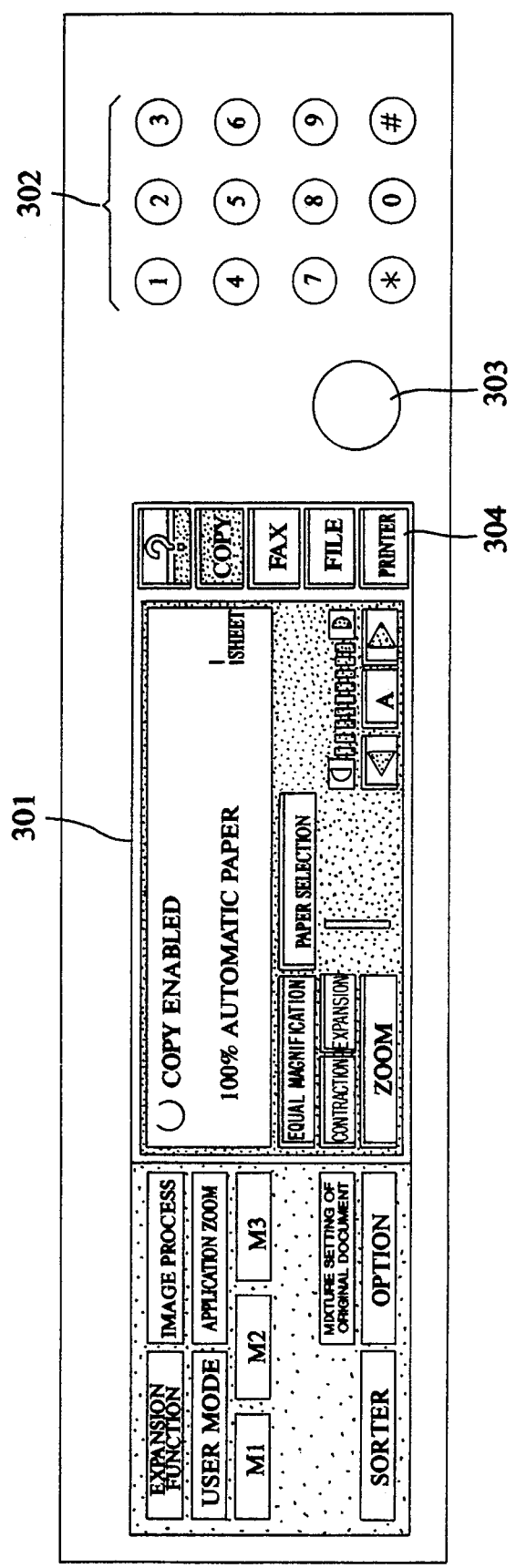
FIG. 3 is a plan view which illustrates an example of a control panel disposed in the reader portion 1 shown in FIG. 1.

FIG. 3 is a plan view showing an example of a control panel disposed in the reader portion 1.

Referring to FIG. 3, reference numeral 301 represents a display portion for displaying state of operation and messages. The surface of the display portion 301 is formed into a touch panel to serve as a selection key when the surface is touched. Reference numeral 302 represents a ten key with which numerals are inputted. Reference numeral 303 represents a start key so that the operation is commenced when the key 303 is depressed.

With reference to a flow chart shown in FIGS. 4 to 9, the various functions and operation of the synthetic-image forming apparatus will now be described.

FIGS. 4 to 9 show a flow chart of an example of the various functions and operation of the synthetic-image forming apparatus.

When electric power has been supplied, initialization is performed (S1). Thus, an operation mode selection key is indicated on the display portion 301 of the control panel. When the panel on the selection key is touched, a mode is selected. Whether or not the selected mode is a copying mode is discriminated (S2). If the copying mode has been selected, the flow proceeds to step S11 shown in FIG. 5.

If a discrimination has been made in step S2 that the copying mode is not selected, whether or not a facsimile transmission mode has been selected is discriminated (S3). If the facsimile transmission mode has been selected, the flow proceeds to step S21 shown in FIG. 6.

If a discrimination has been made in step S3 that the facsimile transmission mode has not been selected, whether or not a file mode has been selected is discriminated (S4). If the file mode has been selected, the flow proceeds to step S31 shown in FIG. 7.

If a discrimination has been made in step S4 that the file mode has not been selected, whether or not an input mode from the computer interface portion 7 has been selected is discriminated (S5). If the input mode has been selected, the flow proceeds to step S41 shown in FIG. 8.

If a discrimination has been made that the input mode has not been selected, whether or not a facsimile receiving mode has been selected is discriminated (S6). If the facsimile receiving mode has been selected, the flow proceeds to step S51 shown in FIG. 9.

If a discrimination has been made in step S6 that the facsimile receiving mode has not been selected, the flow returns to step S2 in which a similar process is repeated.

Figure 4:
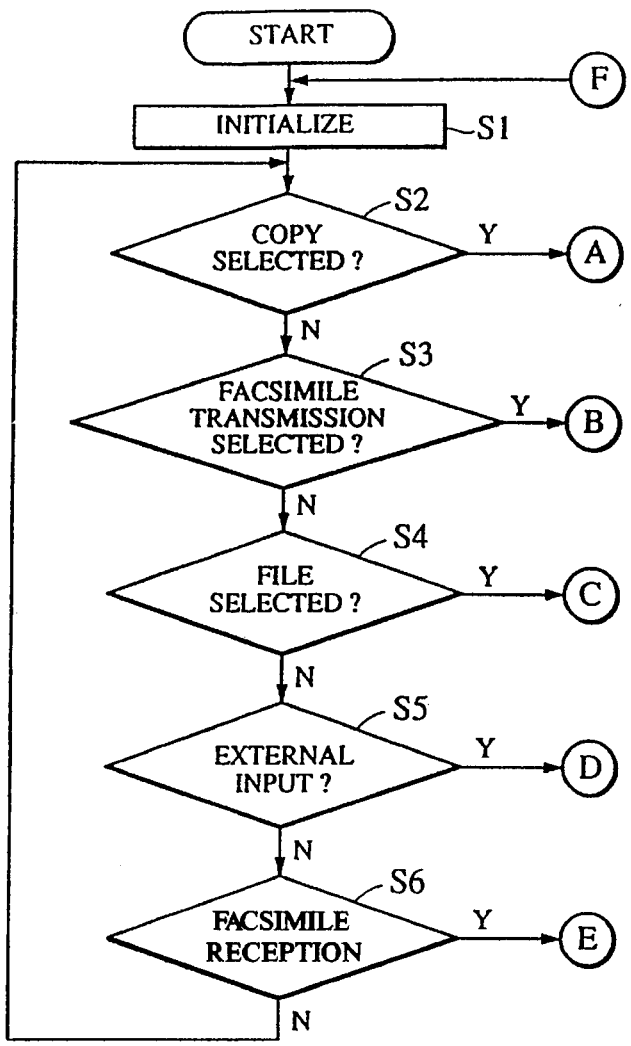
FIG. 4 is a flow chart of an example of the procedure of a function of the synthetic-image forming apparatus.
Figure 5:
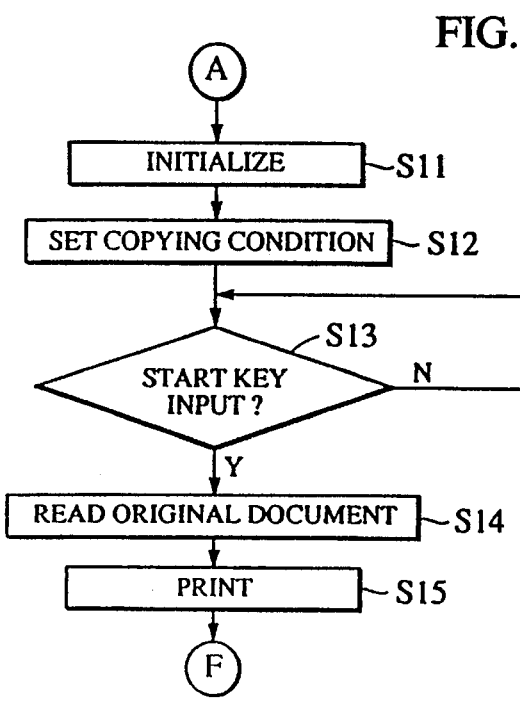
FIG. 5 is a flow chart of an example of the procedure of a function of the synthetic-image forming apparatus.

If a discrimination has been made in step S2 shown in FIG. 4 that the copying mode has been selected, a flow shown in FIG. 5 is commenced and thus the copying operation is initialized (S11). Information about the key inputted from the control panel is read to set the copying conditions (S12) and input of a start key 303 is waited for (S13). When the start key 303 has been depressed, the reader portion 1 reads the original document (S14), and the printer portion 2 prints data (the foregoing printing process). After the printing process has been completed, the flow returns to step S1 shown in FIG. 4 to perform initialization.

Figure 6:
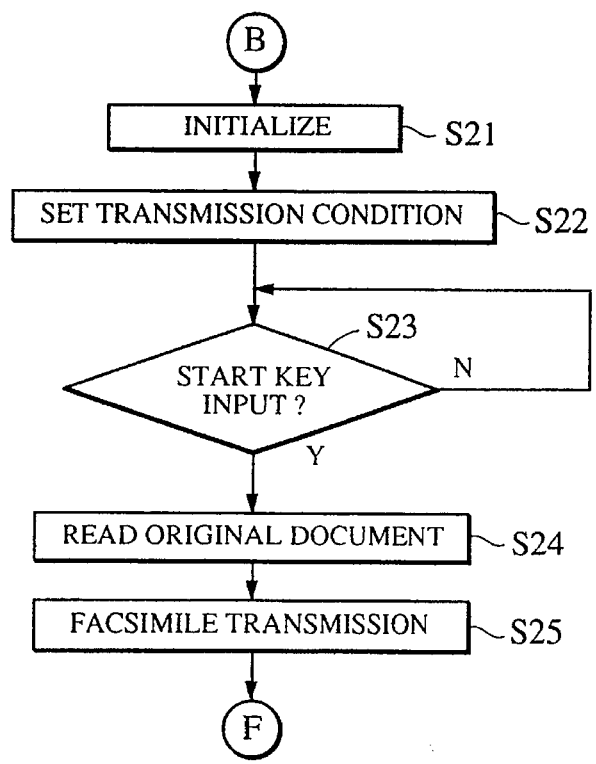
FIG. 6 is a flow chart of an example of the procedure of a function of the synthetic-image forming apparatus.

If a discrimination has been made in step S3 shown in FIG. 4 that the facsimile receiving mode has been selected, a flow shown in FIG. 6 is commenced and the facsimile transmission is initialized (S21). Then, information about the key inputted from the control panel is read to set the facsimile transmitting conditions (S22) and input of the start key 303 is waited for (S23).

When the start key 303 has been depressed, the original document is read by the reader portion 1 (S24) to transmit image data to the facsimile portion 4. The facsimile portion 4 performs facsimile transmission in accordance with a set format and a predetermined protocol (S25). After the transmission has been completed, the flow returns to step S1 shown in FIG. 4.

Figure 7:
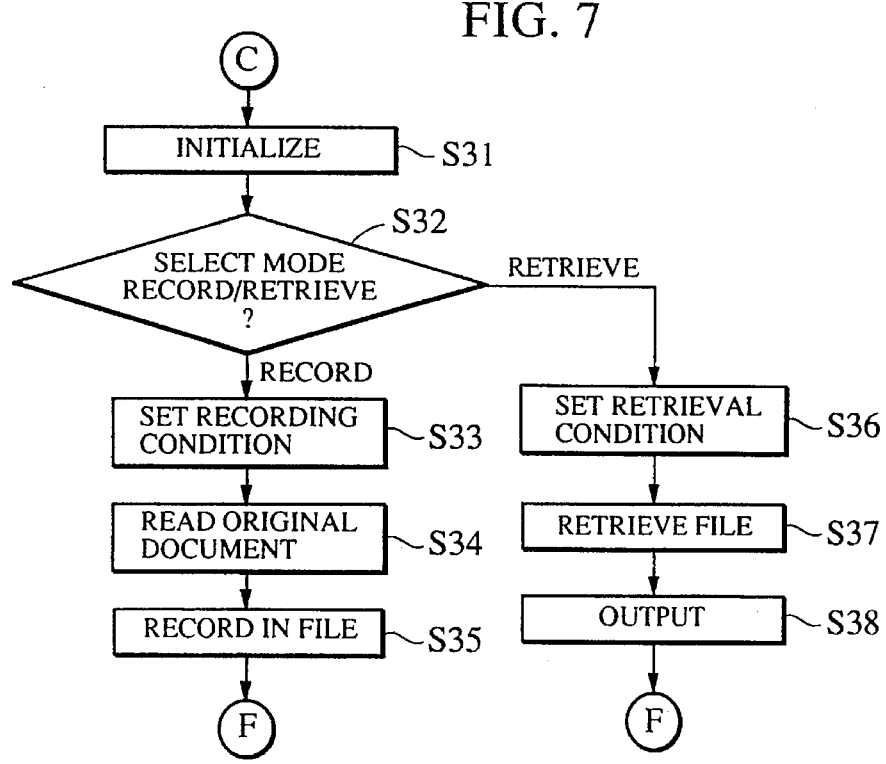
FIG. 7 is a flow chart of an example of the procedure of a function of the synthetic-image forming apparatus.

If a discrimination has been made in step S4 shown in FIG. 4 that the file mode has been selected, a flow shown in FIG. 7 is commenced. Thus, the file operation is initialized (S31). Then, selected mode, the file recording mode or the file retrieval mode, is displayed on the control panel and key input made by an operator is waited for (S32). If a recording key has been selected, the recording conditions are set (S33), and the original document is read by the reader portion 1 (S34). Thus-obtained data is transmitted to the file portion 5 to be recorded on the external storage unit 6 of the file portion 5 (S35).

If a discrimination has been made in step S32 that the file retrieval key has been selected, retrieval conditions are set (S36), the file is retrieved by the external storage unit 6, and the results of the retrieval are outputted (S38). After file recording or the file retrieval has been completed, the flow returns to step S1 shown in FIG. 4 to perform initialization.

Figure 8:
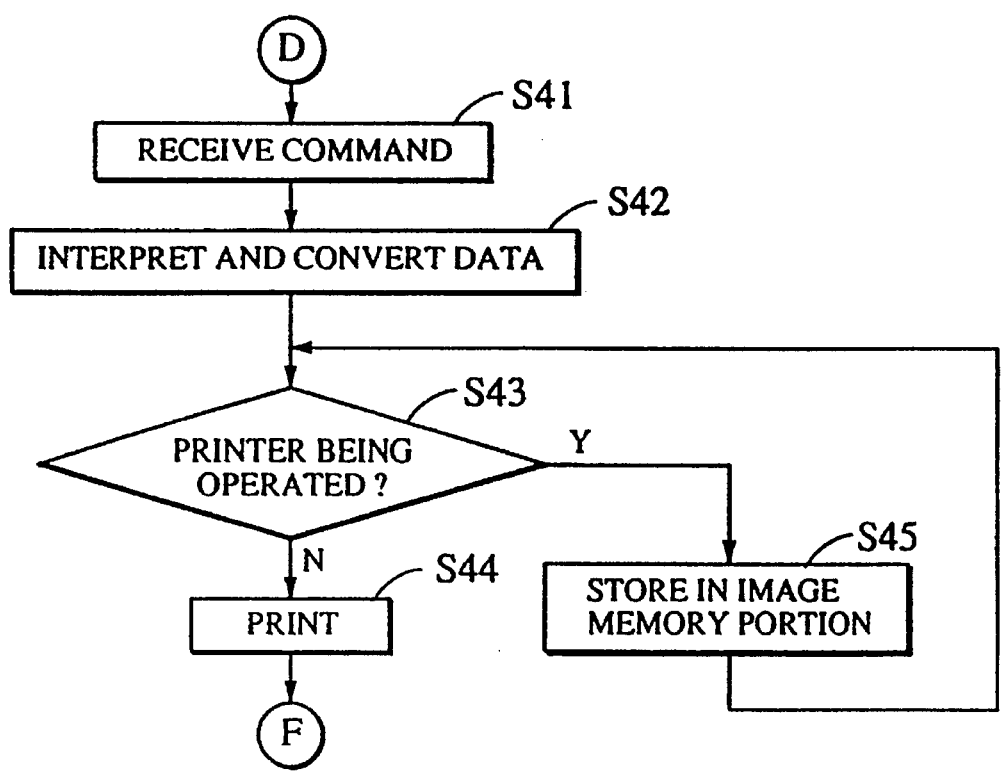
FIG. 8 is a flow chart of an example of the procedure of a function of the synthetic-image forming apparatus.

If a discrimination has been made in step S5 shown in FIG. 4 that command data has been inputted from outside, a flow shown in FIG. 8 is commenced. Thus, the command is received by the computer interface portion 7 (S41) and data is transmitted to the formatter portion 8 through the core portion 10 so as to be interpreted and converted into sematic information such as characters (S42). Then, information is outputted after a confirmation has been made whether or not the printer portion 2 is being operated (S43). If the printer portion 2 is not being operated, data is printed (S44). Then, the flow returns to step S1 shown in FIG. 4.

If the printer portion 2 is being operated, data is stored in the image memory portion 9 (S45), and then the flow returns to step S43 to read data stored when the printer portion 2 is not being operated and printed in the printer portion 2 (S43 and S44). After data has been outputted, the flow returns to step S1 shown in FIG. 4.

Figure 9:
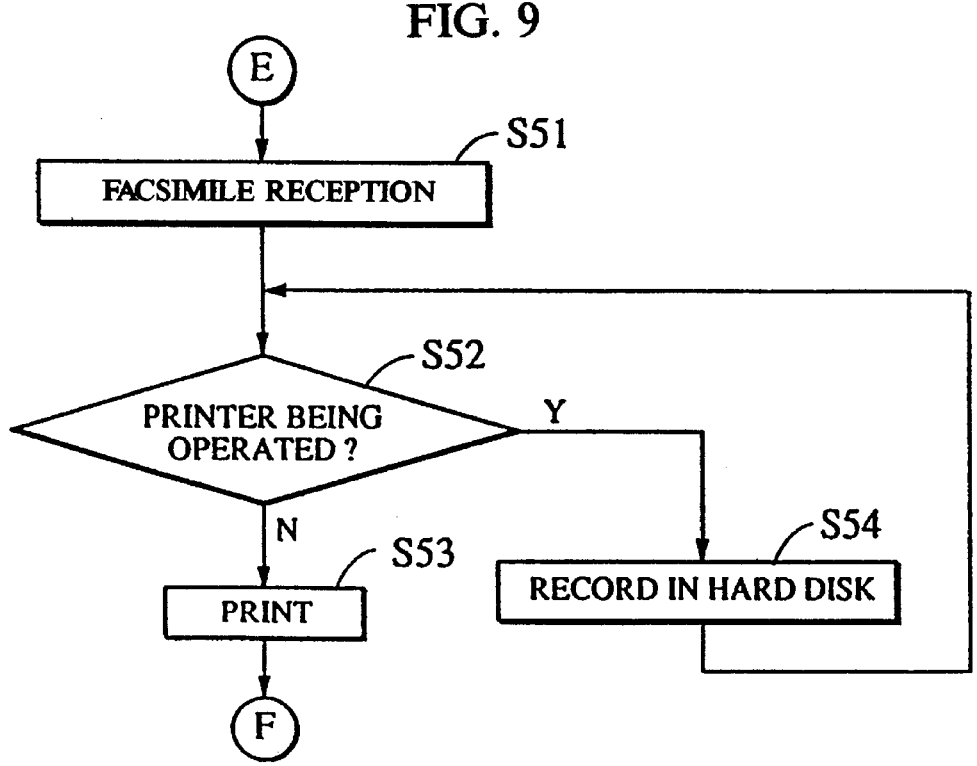
FIG. 9 is a flow chart of an example of the procedure of a function of the synthetic-image forming apparatus.

If a discrimination has been made in step S6 shown in FIG. 4 that the facsimile reception is performed, a flow shown in FIG. 9 is commenced such that the facsimile reception is performed in the facsimile portion 4 (S51). Then, whether or not the printer portion 2 is being operated is discriminated (S52). If it is not being operated, data is transmitted to the printer portion 2 to be printed (S53).

If a discrimination has been made in step S52 that the printer portion 2 is being operated, data is stored in a hard disk (HD) of the facsimile portion 4 (S54). If the printer portion 2 is not being operated, data is printed out from the printer portion 2 (S52 and S53). After the printing operation has been completed, the flow returns to step S1 shown in FIG. 4 to perform initialization.

Whether the foregoing mode is selected with the selection key 301 on the control panel or it is received by the facsimile portion 4 is determined by detecting the external command received by the computer interface portion 7.

Since some of the foregoing operations can be performed simultaneously or the same can be performed individually, the core portion 10 is used to control the priority order or the like.

An operation of synthesizing an image (scanner synthesizing operation) read by the reader portion 1 and an image supplied from the computer 20 will now be described.

Figure 10B:
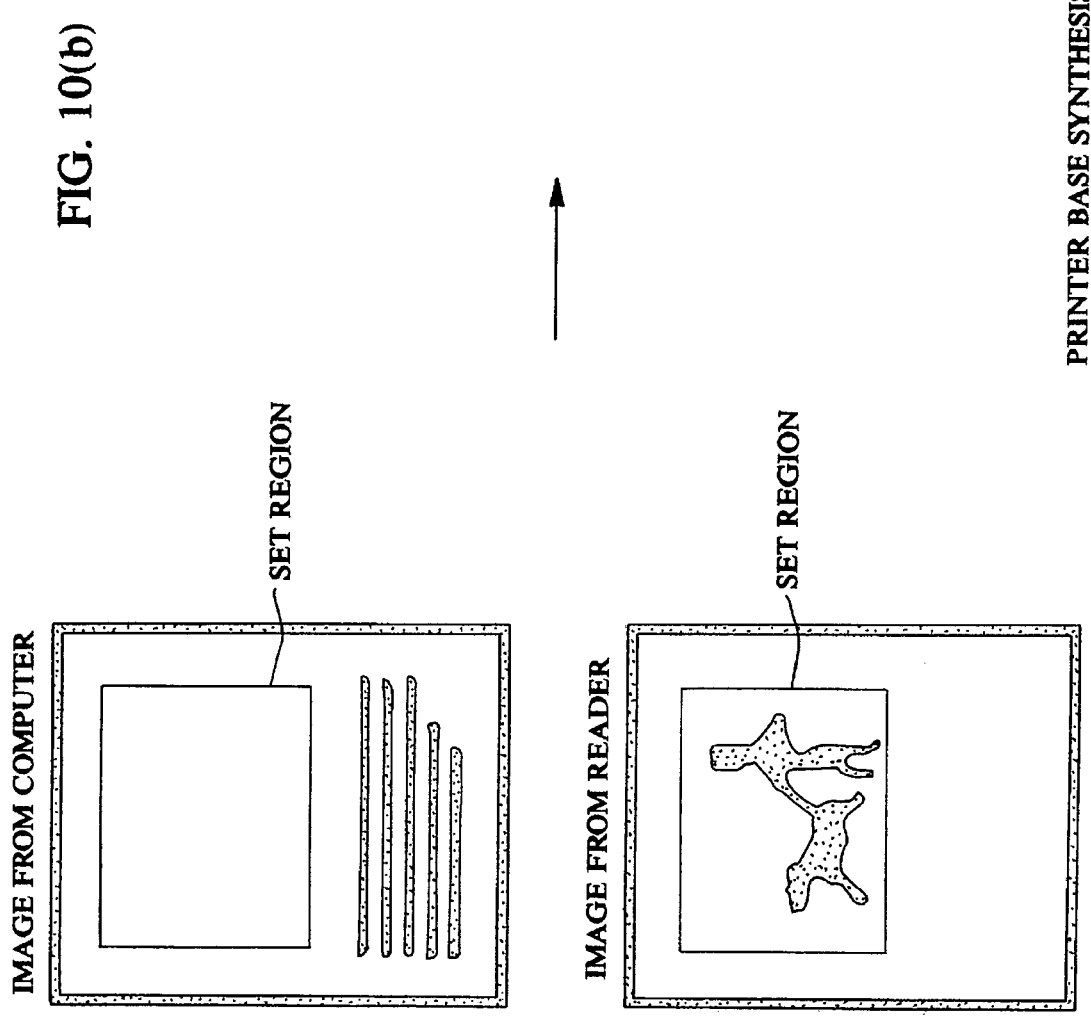

There are scanner base synthesis in which a portion of an image supplied from the computer 20 is, as shown in FIG. 10(a), added to a background, which is formed by an image read by the reader portion 1, and printer base synthesis in which a portion of an image read by the reader portion 1 is, as shown in FIG. 10(b), added to a background, which is formed by an image supplied from the computer 20. The region for the addition is, by an operator, inputted through the ten key 302 of the control panel, the touch panel of the display portion 301 or a digitizer (omitted from illustration).

When code information supplied from the computer 20 is transmitted to the formatter portion 8 through the computer interface portion 7, code information is developed to image information in the formatter portion 8. Image information developed in the formatter portion 8 is supplied to the reader portion 1 through the core portion 10. The reader portion 1 synchronizes with image information supplied from the core portion 10 to start reading the original document placed on the glass surface 102. In accordance with region information set through the touch panel, ten key or the digitizer and used for synthesis, the reader portion 1 switches whether image information supplied from the core portion 10 is transmitted to the printer portion 2 or image information supplied from the CCD 109 is transmitted to the printer portion 2 to perform the scanner base synthesis or the printer base synthesis.

The scanner base synthesis is performed in such a way that if the address which is being read by the CCD 109 is on the outside of the set region, image information supplied from the CCD 109 is transmitted to the printer portion 2. If the present address is in the set region, image information supplied from the core portion 10 is transmitted to the printer portion 2.

The printer base synthesis is performed such that if the address which is being read by the CCD 109 is on the outside of the set region, image information supplied from the core portion 10 is transmitted to the printer portion 2. If the present address is in the set region, image information supplied from the CCD 109 is transmitted to the printer portion 2.

Although this embodiment has the arrangement that image information to be transmitted is switched so that the scanner synthesis is performed, another structure may be employed in which image information supplied from the formatter portion 8, image information supplied from the reader portion 1 and region information are transmitted to the image memory portion 9, the image memory portion 9 synthesizes the images, and then the synthesized image is transmitted to the printer portion 2 through the core portion 10 and the reader portion 1.

The synthetic-image forming apparatus has a variety of functions such as arbitrary appointing a region in the printed image to which the cut image is pasted and automatically varying the magnification of the cut image to be adaptable to the size of the pasting region to paste it in addition to appointing of a region to be cut from the original document.

The procedure of the operations to be performed when the scanner synthesis is performed by the synthetic-image forming apparatus will now be described with reference to FIGS. 11 to 13.

FIGS. 11 to 13 show the procedure of the operations to be performed when the scanner synthesis is performed by the synthetic-image forming apparatus.

The control portion comprises a touch-panel type display 301 so that the operation is commanded when each key area indicated on the display 301 is touched.

Figure 11A:
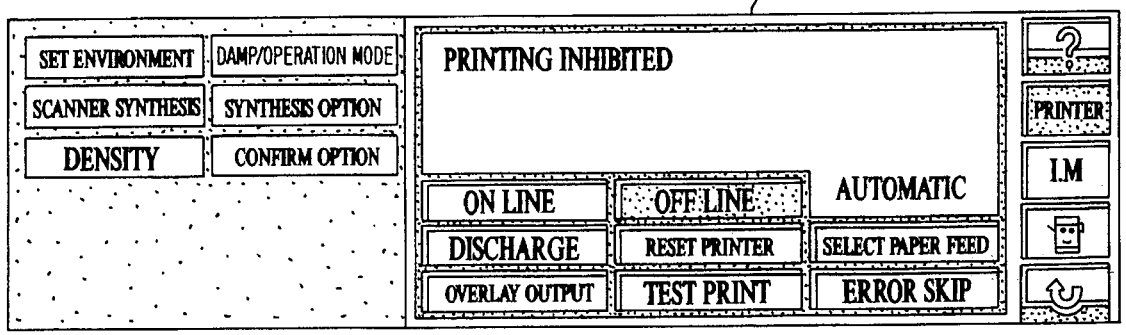
FIGS. 11(a) through 11(d) illustrates the procedure of a scanner synthesis operation to be performed by the synthetic-image forming apparatus.
Figure 11B:
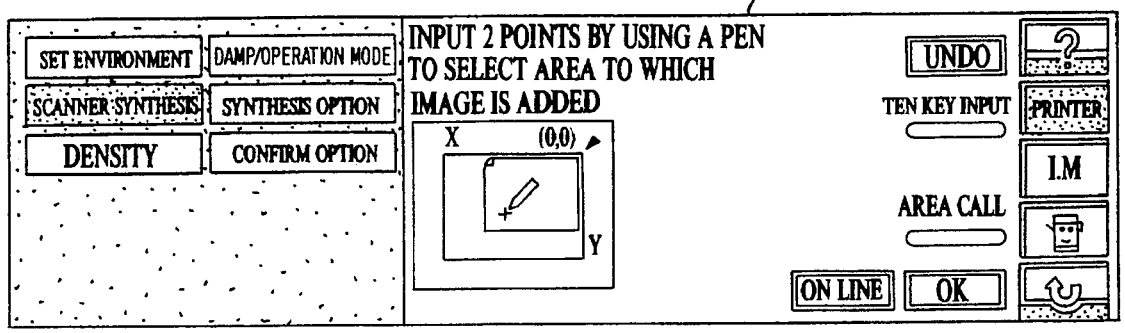
Figure 12A:
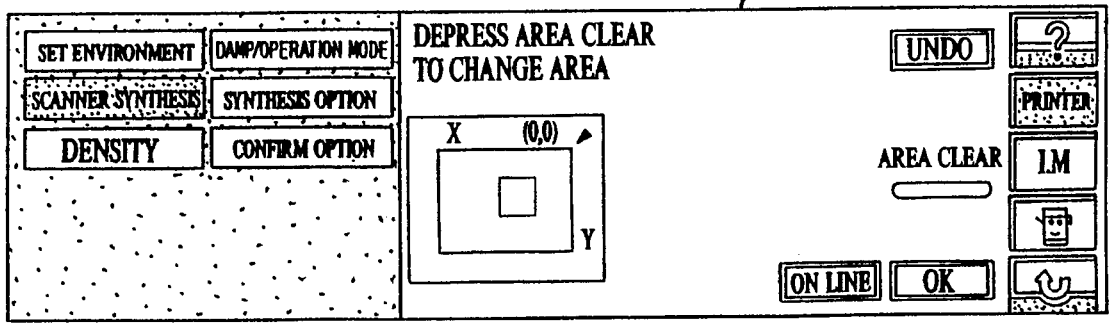
FIGS. 12(a) through 12(d) illustrates the procedure of a scanner synthesis operation to be performed by the synthetic-image forming apparatus.

When key area "Printer" 304 shown in FIG. 3 is depressed, the printer mode is realized and display is switched to that shown in FIG. 11(a). When key area "Off Line" shown in FIG. 11(a) is depressed, the area is inverted and displayed. As a result, the printer function is brought to an off line state. When key area "Scanner Synthesis" is depressed in this state, the indication on the display 301 is switched to a display shown in FIG. 11(b) and the key area "Scanner Synthesis" is reversed and displayed.

Figure 11C:
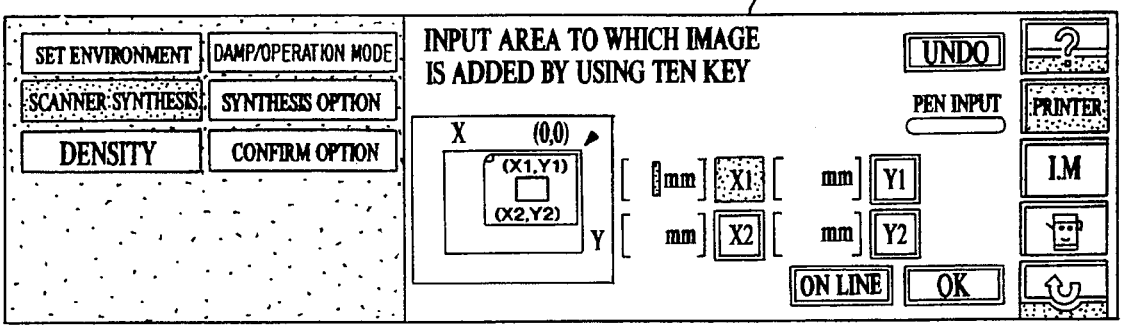

When an operator inputs the area to which the image is added with two points with a pen of the digitizer, which can be connected as an option, or depresses the key area "Ten Key Input", a display shown in FIG. 11(c) is indicated on the display 301 to input, with numerals, the area to which the image is added.

Figure 11D:
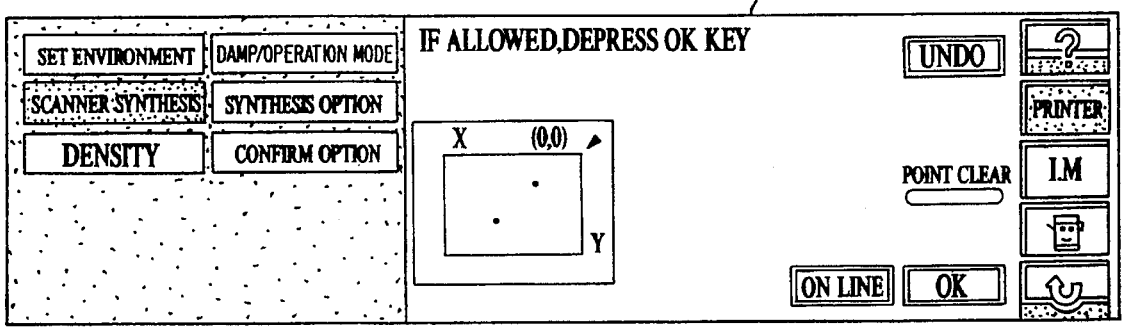

When the coordinates of the two points are inputted on the display shown in FIGS. 11(b) and 11(c), the two inputted points are indicated on the display 301 as shown in FIG. 11(d). If key area "Point Clear" has been depressed on the display, the indication on the display 301 is switched to that shown in FIG. 11(b) to wait for input of the area to which the area is added. Note that this embodiment has an arrangement that each point is cleared whenever the key area "Point Clear" is depressed.

Figure 12B:
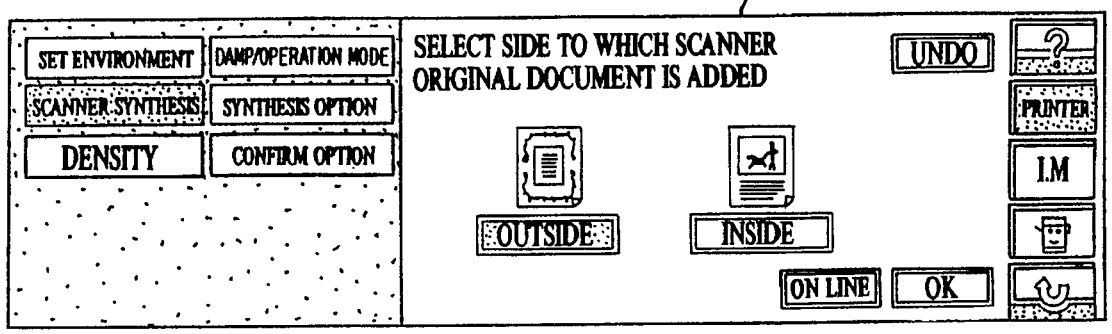

If key area "OK" is depressed on the display shown in FIG. 11(d), the indication on the display 301 switched to that shown in FIG. 12(b) and a command whether the scanner original document is added to the inside or the outside of the image synthesis region is waited for. In this apparatus, "Outside" displayed reversibly is selected.

When key area "Undo" is depressed on the display shown in FIG. 12(b), the indication on the display 301 is switched to that shown in FIG. 12(a) so that instruction of area change is allowed. When key area "Area Clear" is depressed in the foregoing state, the indication on the display 301 is switched to those shown in FIGS. 11(a) and 11(b). With the foregoing displays, re-appointment of the area is waited for. If the key area "Undo" is depressed on the display shown in FIG. 12(a), the display is switched to that shown in FIG. 11(a).

If the key area "OK" is depressed in a state shown in FIG. 12(a), the indication on the display 301 is again switched to the indication shown in FIG. 12(b). If the key area "OK" is depressed on the foregoing display, the indication on the display 301 is switched to that shown in FIG. 12(c) to input the number of pages (an arbitrary figure from 1 to 999) of print data. If the key area "OK" is depressed on the foregoing display, the indication on the display 301 is switched to that shown in FIG. 12(d). When key area "Scanner Synthesis" is depressed on the foregoing display, the indication on the display 301 is switched to that shown in FIG. 12(a).

Figure 12C:
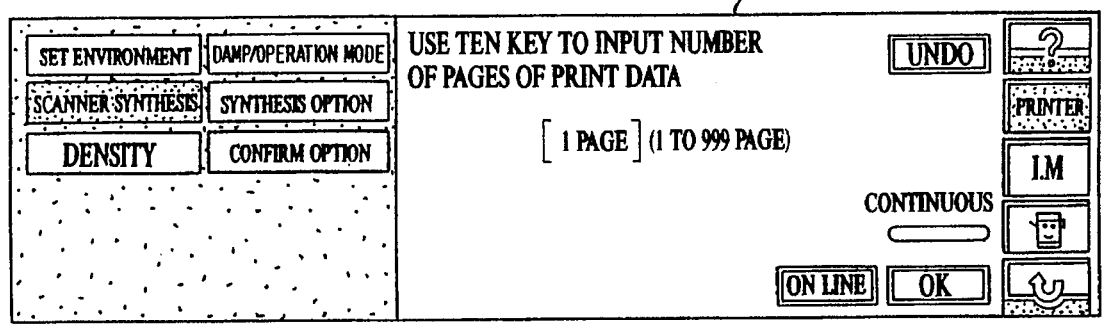
Figure 12D:
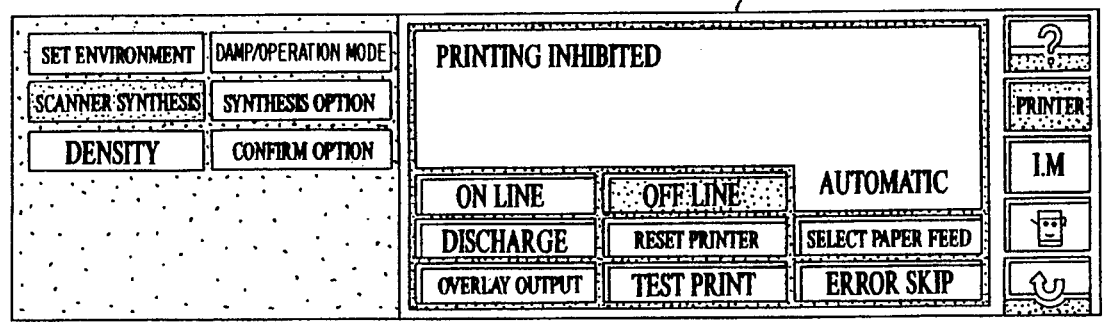
Figure 13A:
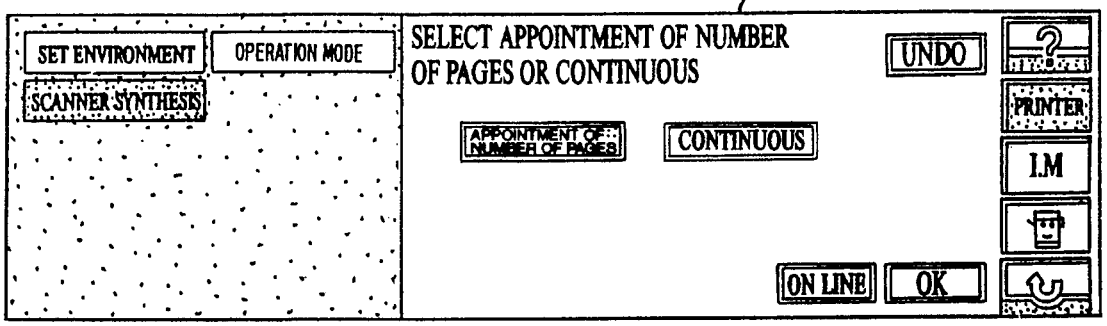
FIGS. 13(a) and 13(b) illustrates the procedure of a scanner synthesis operation to be performed by the synthetic-image forming apparatus.
Figure 13B:
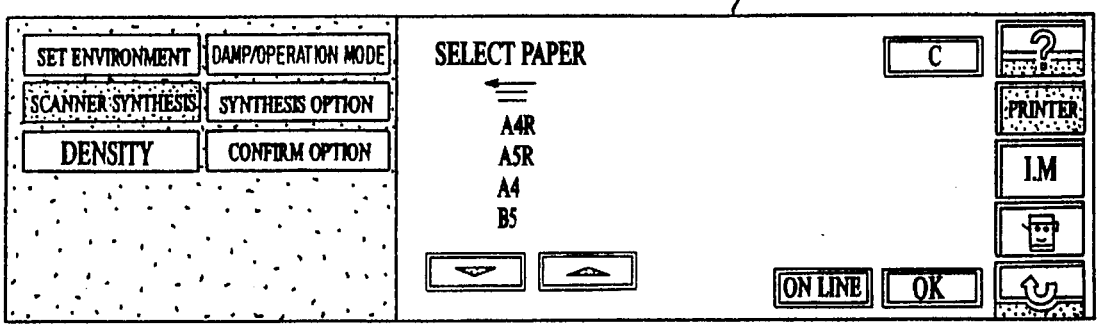

If the key area "Continuous" is depressed in the state of the display shown in FIG. 12(c), the indication on the display 301 is switched to that shown in FIG. 13(a) in which whether the original document to be subjected to the scanner synthesis is "Page Appointment" or "Continuous" is instructed. If the key areas "Continuous" and "OK" are depressed on the foregoing display, the indication on the display 301 is switched to that shown in FIG. 12(d). If the key area "Page Appointment" or "OK" or "Undo" is depressed on the foregoing display, the indication on the display 301 is switched to that shown in FIG. 12(c). When the operation of setting required for the scanner synthesis has been completed, a display (refer to FIG. 13(b)) for selecting paper is indicated on the display 301 of the control portion.

Figure 14A:
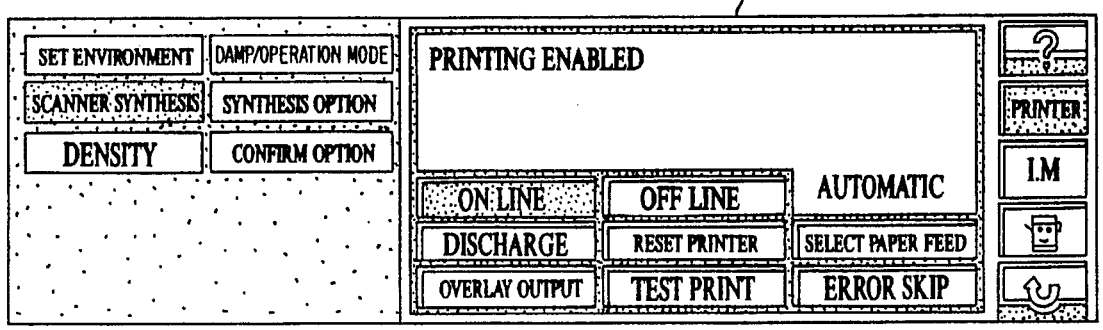
FIGS. 14(a) and 14(b) illustrates an example of a display for waiting for the scanner synthesis to be performed by the synthetic-image forming apparatus.
Figure 14B:
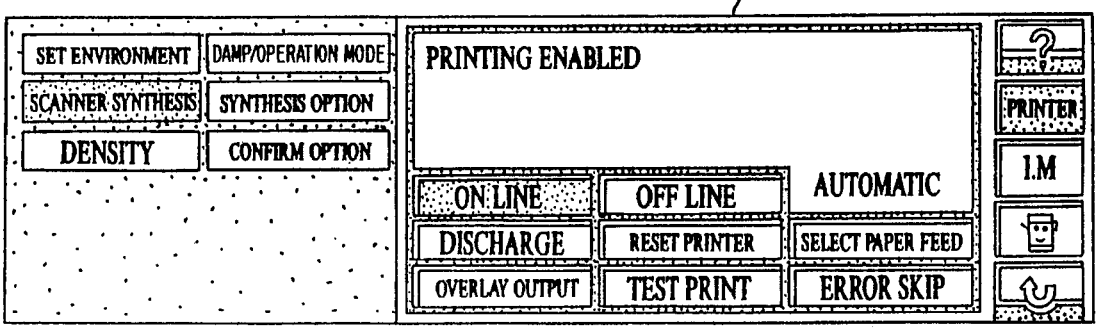

FIGS. 14(a) and 14(b) are diagrams showing an example of a display for waiting for the scanner synthesis to be performed in the synthetic-image forming apparatus according to the present invention.

If the scanner original document is set on the inside of the appointed area as shown in FIGS. 10(a) and 10(b), a display shown in FIG. 14(a) is indicated on the display 301 at the time of waiting for the scanner synthesis. If the scanner original document is set on the outside of the appointed area, a display shown in FIG. 14(b) is indicated on the display 301 at the time of waiting for the scanner synthesis.

Figure 15A:
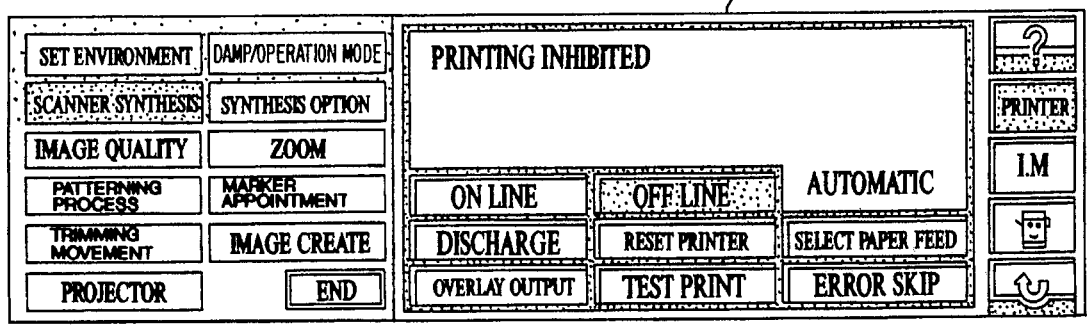
FIGS. 15(a) and 15(b) illustrates an example of a display for an option function of the scanner synthesis to be performed by the synthetic-image forming apparatus.
Figure 15B:
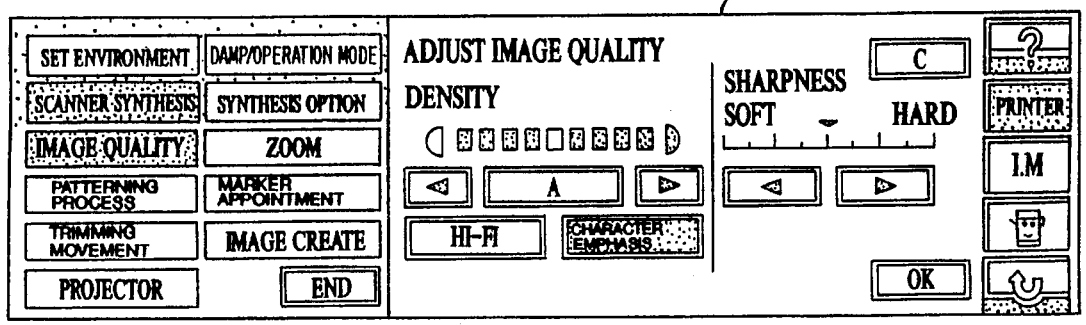

FIGS. 15(a) and 15(b) are diagrams showing an example of option setting display for the scanner synthesis to be performed in the synthetic-image forming apparatus according to the present invention, the example corresponding to an image-quality setting operation.

If key area "Image Quality" is depressed in a state where an indication shown in FIG. 15(a) is displayed on the display 301, that is, in a state where the key area "Scanner Synthesis" is indicated reversibly, the indication on the display 301 is switched to that shown in FIG. 15(b) in which the density (HI-FI/character emphasis) and sharpness can be appointed. Thus, the printing density can be adjusted or the white and black of the image can be cleared to correspond to the type of the original document, for example, the character original document or the photograph original document. If the key area "OK" or key area "C" is depressed in the state of display shown in FIG. 15(b), the indication on the display 301 is switched to that shown in FIG. 15(a) in which resetting is enabled.

Figure 16A:
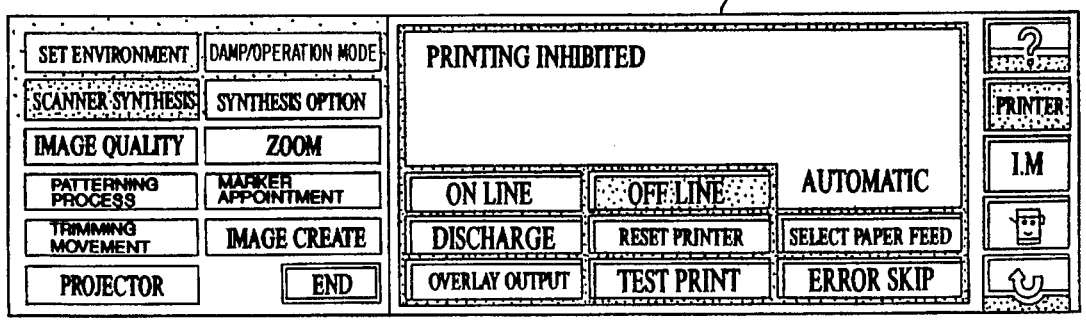
FIGS. 16(a) and 16(b) illustrates an example of a display for an option function of the scanner synthesis to be performed by the synthetic-image forming apparatus.
Figure 16B:
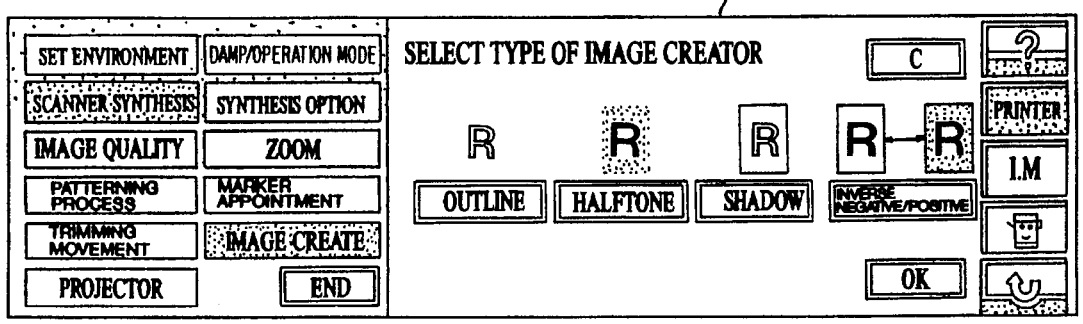

FIGS. 16(a) and 16(b) are diagrams showing an example of a display for option setting allowed in the scanner synthesis to be performed by the synthetic-image forming apparatus according to the present invention. This example corresponds to a display for setting image creating operation.

If key area "Image Create" is depressed in a state where a display shown in FIG. 16(a) is indicated on the display 301, that is, the key area "Scanner Synthesis" is displayed reversibly, the indication on the display 301 is switched to that shown in FIG. 16(b) in which any one of various image creating processes can be set, for example, "Outline", "Half-tone", "Shadow" and "Negative/Positive reversal" or the like. If the key area "OK" or the key area "C" is depressed in a state of the display shown in FIG. 16(b), the indication on the display 301 is switched to that shown in FIG. 16(a) in which resetting is permitted.

FIGS. 17(a) through 17(d), 18(a), and 18(b) are diagrams showing examples of option setting allowed in the scanner synthesis operation to be performed by the synthetic-image forming apparatus according to the present invention. The foregoing examples correspond to a display for setting trimming movement.

Figure 17A:
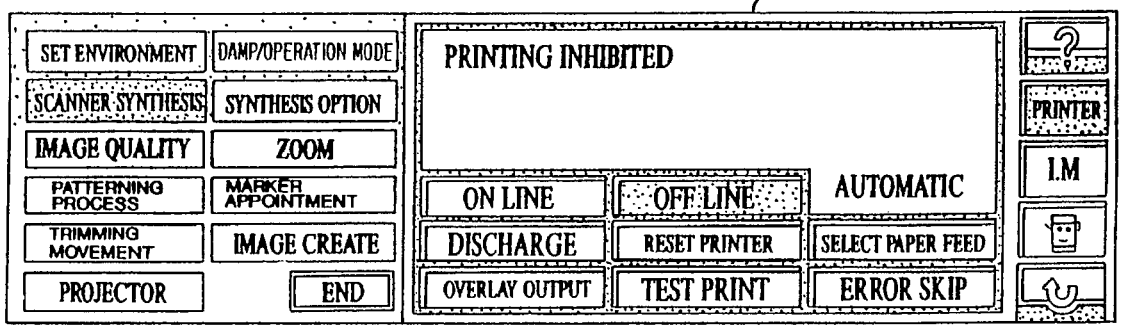
FIGS. 17(a) through 17(d) illustrates an example of a display for an option function of the scanner synthesis to be performed by the synthetic-image forming apparatus.
Figure 17B:
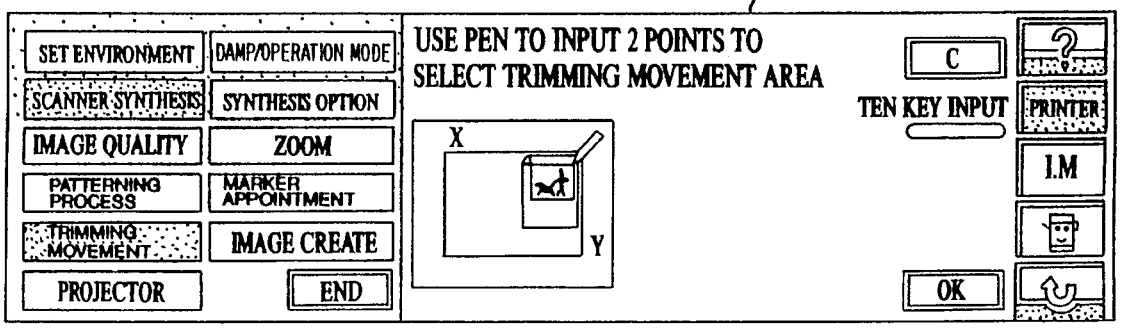

If key area "Trimming Movement" is depressed in a state where an indication shown in FIG. 17(a) is displayed on the display 301, that is the key area "Scanner Synthesis" is displayed reversibly, the indication on the display 301 is switched to that shown in FIG. 17(b) in which the key area "Trimming Movement" is displayed reversibly.

Figure 17C:
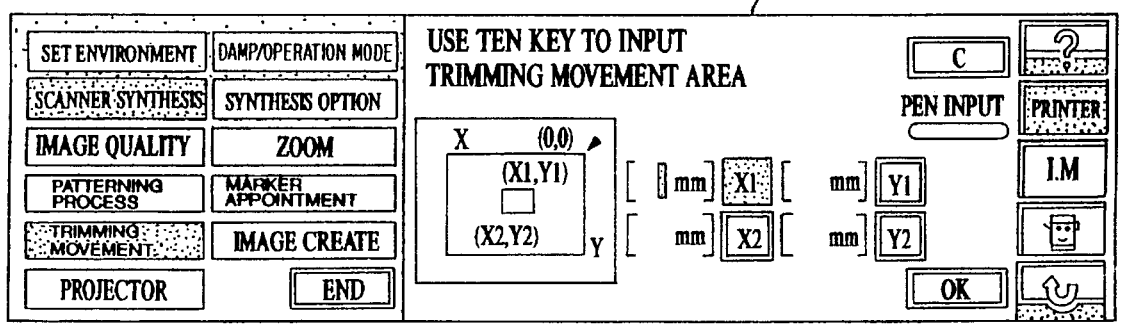

In the foregoing state, the area, to which the image is added, is inputted with two points by using a pen of an editor which can be connected as an option or a display shown in FIG. 17(c) is indicated on the display 301 and the area to which the image is added is inputted with numerals by using the ten key of the control portion.

Figure 17D:
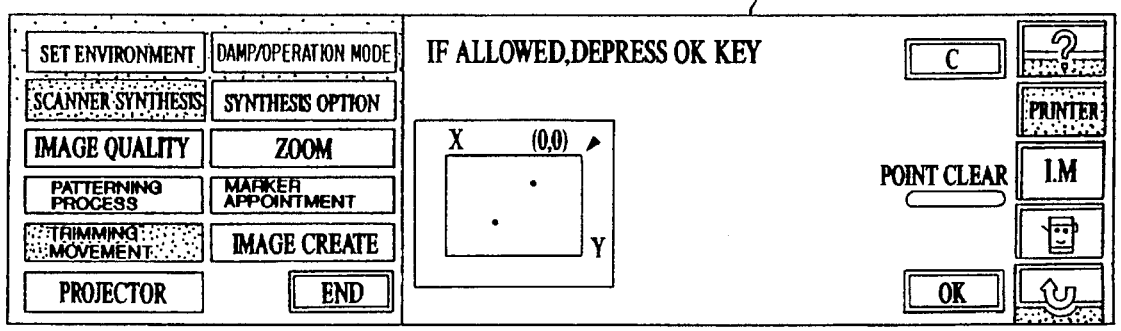

When the coordinates of the two points are inputted on the displays shown in FIGS. 17(b) and 17(c), the two inputted points are displayed as shown in FIG. 17(d). If key area "Point Clear" is depressed on the foregoing display, the indication on the display 301 is switched to that shown in FIG. 17(b) in which two points of the area, to which the image is added, are again inputted. In this embodiment, the two appointed points are cleared one by one.

Figure 18A:
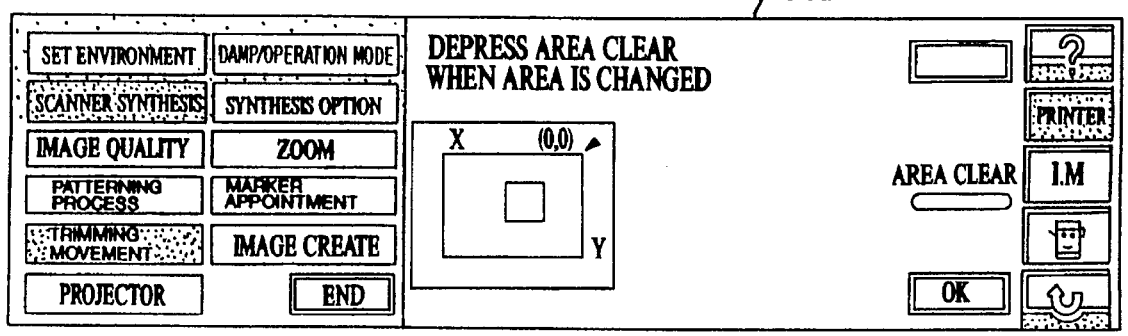
FIGS. 18(a) and 18(b) illustrates an example of a display for an option function of the scanner synthesis to be performed by the synthetic-image forming apparatus.
Figure 18B:
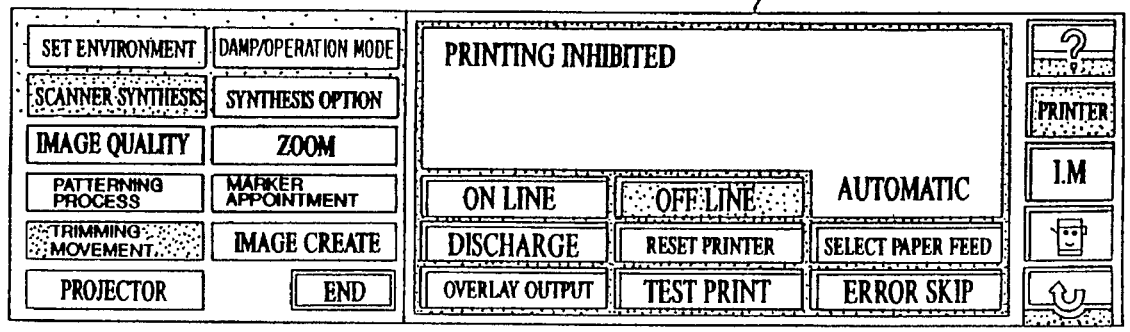

If the key area "OK" is depressed on a display shown in FIG. 17(d), the indication on the display 301 is switched to that shown in FIG. 18(b). If the key area "Trimming Movement" is depressed, the indication on the display 301 is switched to that shown in FIG. 18(a) in which the appointed trimming movement is displayed in the form of a graphic. If the key area "OK" is depressed on the foregoing display, the indication on the display 301 is again switched to that shown in FIG. 18(b). Thus, setting of the trimming movement is completed. If the key area "Area Clear" is depressed on the display shown in FIG. 18(a), the indication on the display 301 is switched to that shown in FIG. 17(b) in which the appointment of the trimming movement area is again permitted.

FIGS. 19(a) through 19(c), 20(a), and 20(b) show an example of option operation permitted for the scanner synthesis operation to be performed by the synthetic-image forming apparatus. This example corresponds to a zoom setting operation.

Figure 19A:
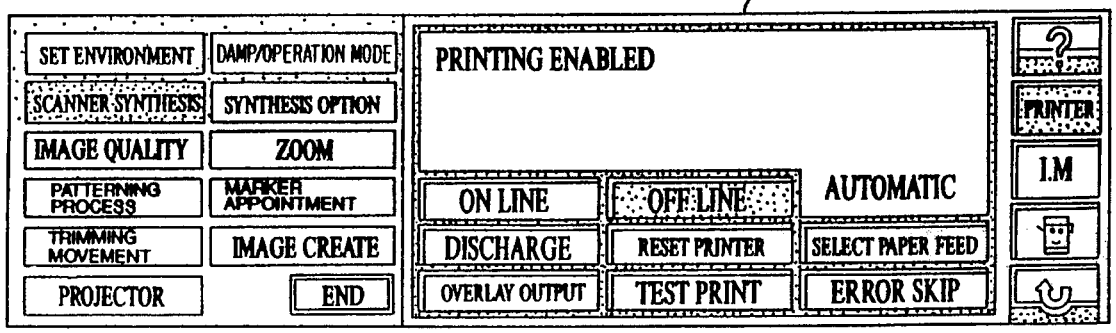
FIGS. 19(a) through 19(b) illustrates an example of a display for an option function of the scanner synthesis to be performed by the synthetic-image forming apparatus.
Figure 19B:
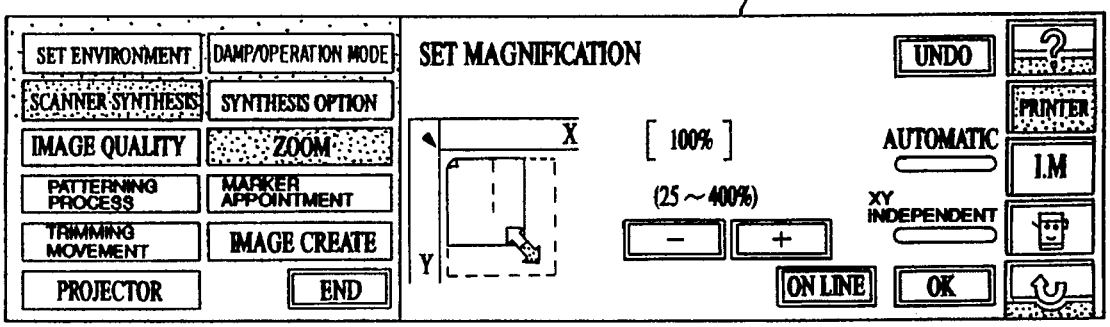
Figure 19C:
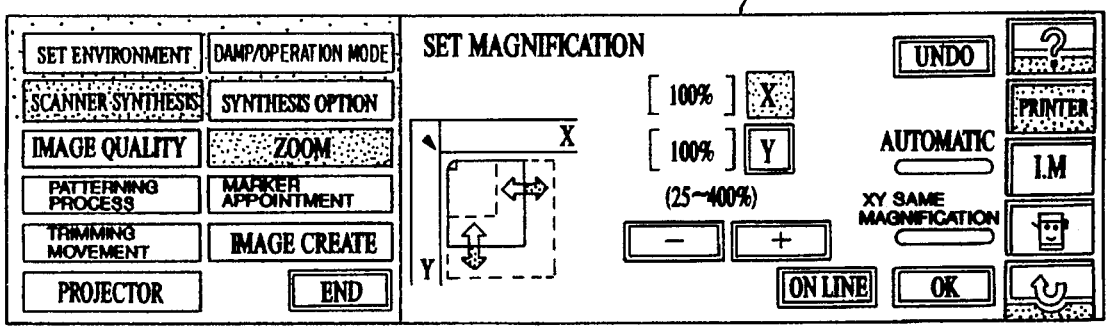

If the key area "Scanner Synthesis" is depressed in a state where an indication shown in FIG. 19(a) is displayed on the display 301, that is, the key area "Scanner Synthesis" is displayed reversibly, the indication on the display 301 is switched to that shown in FIG. 19(b) in which key area "Zoom" is displayed reversibly. If key area "XY Independent" is depressed during indication of the foregoing display, the indication on the display 301 is switched to that shown in FIG. 19(c) in which setting of zooming is permitted such that the vertical and horizontal zooming ratio can be individually set (20% to 400% with respect to a reference magnification of 100%). If key area "XY Same Magnification" is depressed during indication of the foregoing display, the indication on the display 301 is switched to that shown in FIG. 19(b). If the key area "OK" is depressed on the display shown in FIG. 19(b) and on that shown in FIG. 19(c), the indication on the display 301 is switched to that shown in FIG. 19(a). Thus, the zoom setting operation is completed.

Figure 20A:
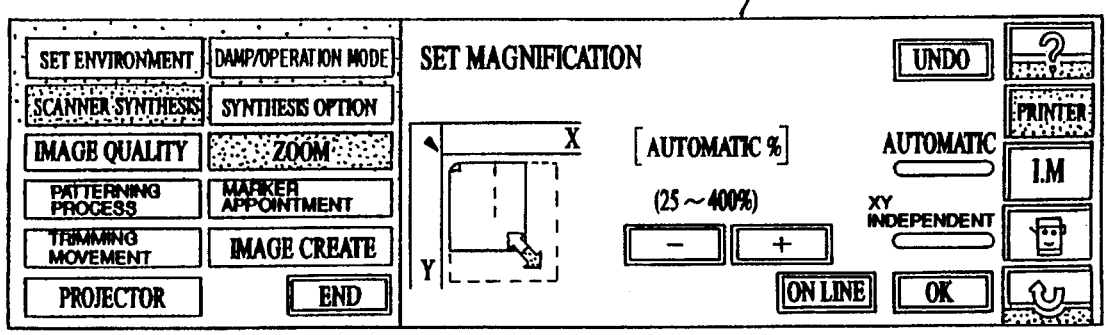
FIGS. 20(a) and 20(b) illustrates an example of a display for an option function of the scanner synthesis to be performed by the synthetic-image forming apparatus.
Figure 20B:
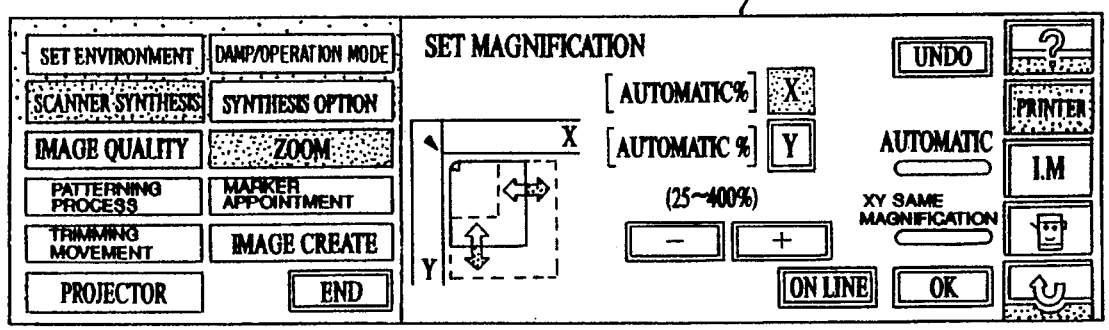

If key area "Auto" is selected in a state of display shown in FIG. 19(b), the indication on the display 301 is switched to that shown in FIG. 20(a). If the key area "XY Independent" is depressed during indication of the foregoing display, the indication on the display 301 is switched to that shown in FIG. 20(b) in which setting of zooming is permitted such that the vertical and horizontal zooming ratio can be individually set (20% to 400% with respect to a reference magnification of 100%). If key area "XY Same Magnification" is depressed during indication the foregoing display, the indication on the display 301 is switched to that shown in FIG. 20(a). If the key area "OK" is depressed on the display shown in FIG. 20(a) and on that shown in FIG. 20(b), the indication on the display 301 is switched to that shown in FIG. 19(a). Thus, the zoom setting operation is completed.

By performing the various scanner synthesis operations as described above, a portion of a letter head, a logo mark or an illustration can be scanned into a rectangular shape and it can be superimposed on data to be printed so as to be printed on one sheet.

Figure 21:
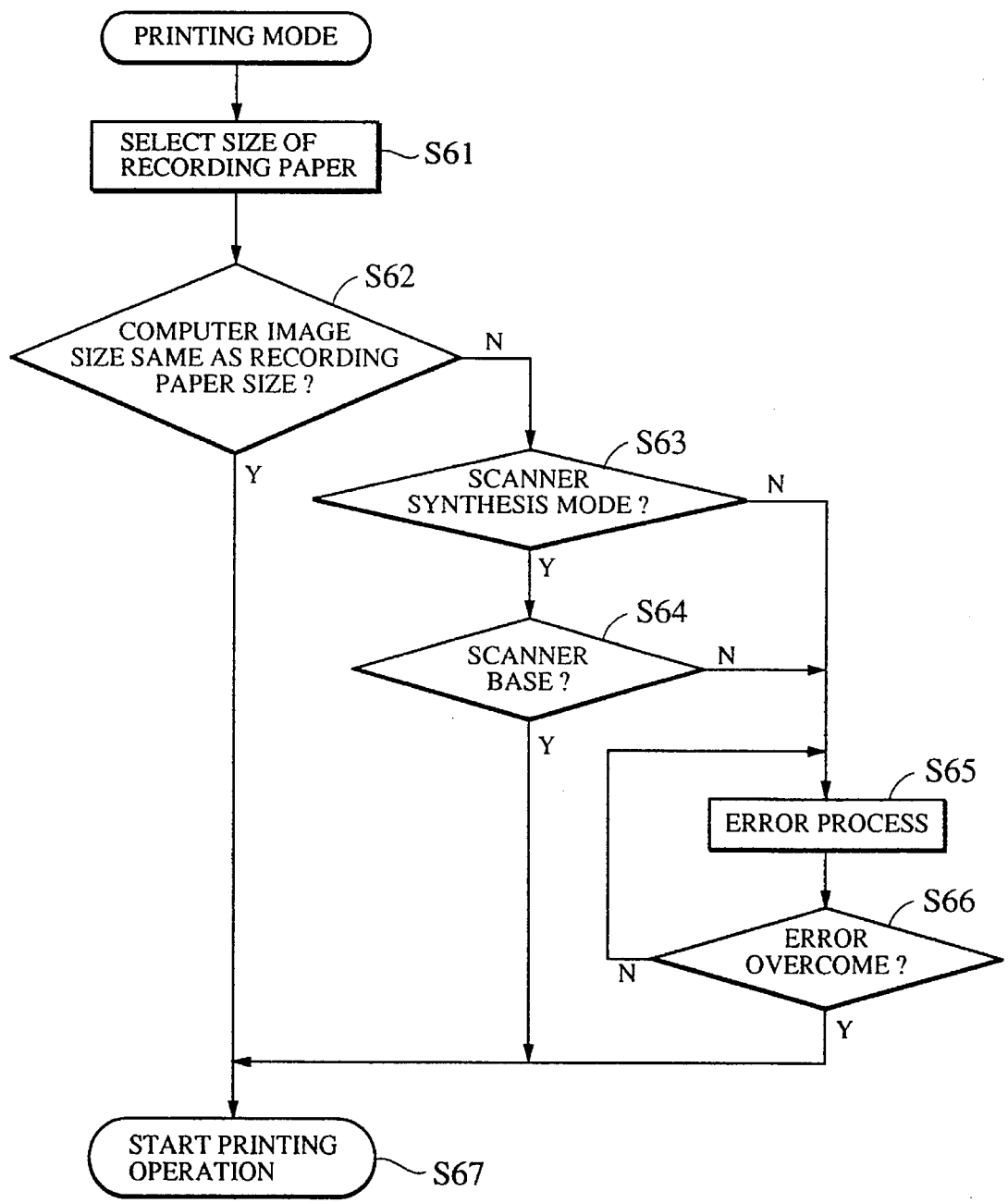
FIG. 21 is a flow chart of a printing mode in the synthetic-image forming apparatus.

With reference to a flow chart shown in FIG. 21 of the printing mode of the synthetic-image forming apparatus, an operation of synthesizing (scanner synthesis) an image supplied from the CCD 109 and an image supplied from the formatter portion 8 will now be described. In particular, an operation to be performed when the size of the background image and the size of the selected recording paper do not coincide with each other will now be mainly described.

The computer 20 is able to transmit information about the size of an image to be transmitted through the computer interface portion 7 when code information is transmitted, while the reader portion 1 is able to detect the size of an original document to be read.

The apparatus according to the present invention performs the scan synthesis in such a way that an image obtained by scanning an original document and an image supplied from the computer 20 are synthesized in accordance with an appointed area to record the synthesized image on one recording paper sheet. Therefore, the size of the scanned image, that of the image supplied from the computer 20 and that of the recording paper sometimes do not coincide with one another. If the size of the original document to be scanned is A3-size and the size of the image supplied from the computer 20 is A4-size, appointment of the size of the output recording paper to be A3 causes the size of the recording paper and the size of the image supplied from the computer 20 to be different from each other though the size of the appointed recording paper and that of the original document to be scanned coincide with each other. In a case where scanner base synthesis is performed in the apparatus according to the present invention, commencement of the scanner synthesis operation is permitted even if the size of the image supplied from the computer 20 and the size of the recording paper do not coincide with each other. In a case where the printer base synthesis is performed, the commencement of the scanner synthesis operation is inhibited if the size of the image supplied from the computer 20 and that of the recording paper do not coincide with each other.

Initially, a user selects the size of the recording paper (S61), and then the size of the image supplied from the computer 20 and that of the recording paper are subjected to a comparison with each other (S62). If they coincide with each other, the printing operation is commenced (S67).

Figure 22:
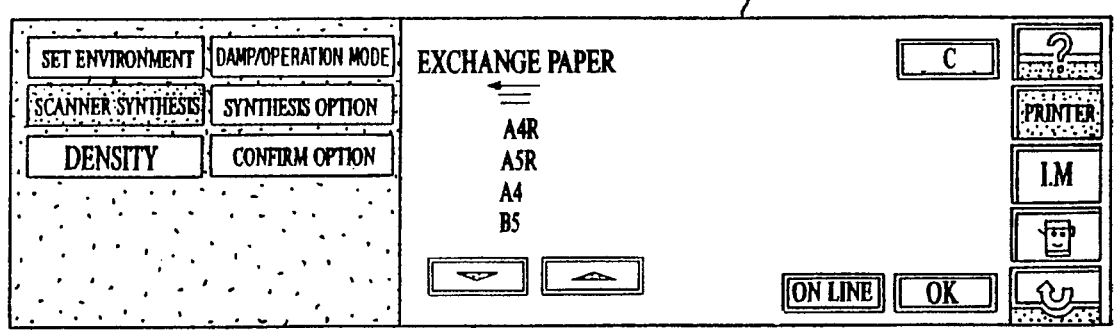
FIG. 22 is a diagram which illustrates an example of a display in step S65 shown in FIG. 21.

If a discrimination has been made in step S62 that they do not coincide with each other, whether or not the present printing mode is the scanner synthesis is discriminated (S63). If the usual printing mode is selected, the error is discriminated to be valid and thus an error compensating process is performed such that a message, for example, "Exchange Sheet" is displayed as shown in FIG. 22 (S65). Then, whether or not the error state has been overcome is discriminated (S66). If the error state has been overcome, the printing operation is commenced (S67).

If a discrimination is made in step S66 that the error state has not been overcome, the flow returns to step S65 to again perform the error compensating process.

If a discrimination is made in step S63 that the printing mode is the scanner synthesis, a discrimination is made as to whether or not the mode is the scanner base (S64). If it is the printer base, an error discrimination is made similarly to the usual printing mode and the process from step S65 is repeated.

If a discrimination is made in step S64 that the scanner base is selected, a discrimination is made that the size error is invalid, and the flow proceeds to step S67 in which the printing operation is commenced.

Thus, in a case of the printer base synthesis, recording on the recording paper having the size which coincides with the size of the image supplied from the computer 20 is enabled. In a case of the scanner base synthesis, the sizes do not affect mutually so that appointed recording operation is enabled.

Figure 23:
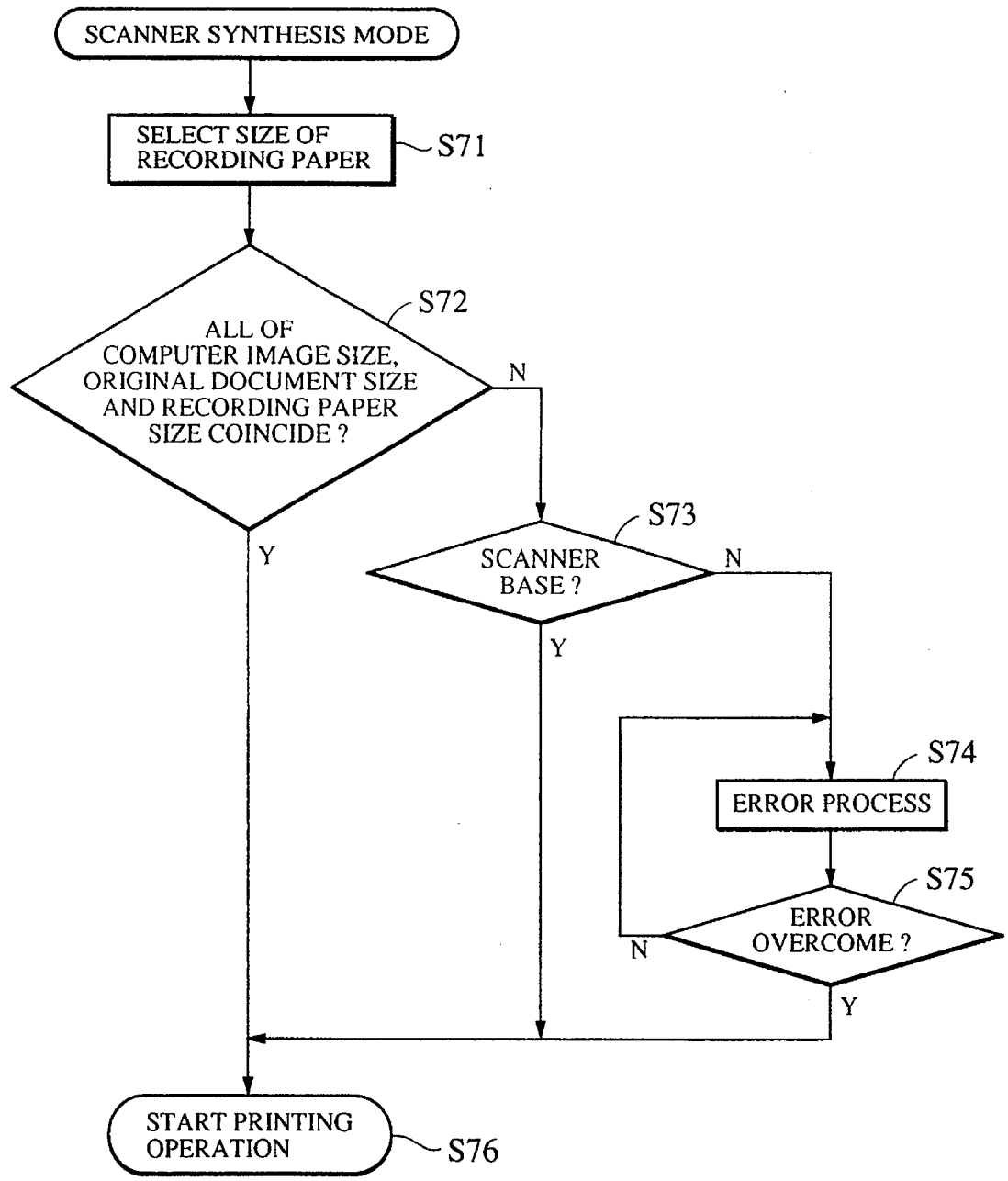
FIG. 23 is a flow chart of a scanner synthesis mode according to another embodiment.

FIG. 23 is a flow chart of a scanner synthesis mode in a printing mode according to another embodiment of the present invention.

Initially, a user selects the size of the recording paper (S71), and then the size of an image supplied from the computer 20, the size of an original document and the size of the recording paper are subjected to a comparison (S72). If they coincide with one another, the printing operation is commenced (S76).

If a discrimination is made in step S72 that they do not coincide with one another, whether or not the scanner base is discriminated (S73). If a discrimination is made in step S73 that the operation is not the scanner base, that is, the operation is the printer base, an error process is performed in such a way that a message, for example, "Exchange Paper" is displayed as shown in FIG. 22 (S74). Then, whether or not the error state has been overcome is discriminated (S75). If the error state has been overcome, the printing operation is commenced (S76).

If a discrimination is made in step S75 that the error state has not been overcome, the flow returns to step S74 to again perform the error compensating process.

As a result, in a case of the printer base synthesis, recording on the recording paper having the size which coincides with the size of the image supplied from the computer 20 and that of the original document is enabled. In a case of the scanner base synthesis, the sizes do not affect mutually so that appointed recording operation is enabled.

Although this embodiment has been described with reference to the synthesis of the image supplied from the computer 20 and the image of an original document, a similar control may be employed in synthesis of an image supplied from the computer 20 and a facsimile image supplied from the facsimile portion 4 or synthesis of an image from the computer 20 and a file image supplied from the file portion 5.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. An image forming apparatus comprising:

first input means for inputting image information from a computer;

second input means for inputting original document image information;

third input means for inputting region information indicating a region in which images are synthesized;

selection means for selecting one of a first mode in which said image information from said first input means is formed outside the region and the original document image information from said second input means is formed inside the region, and a second mode in which said image information from said first input means is formed inside the region and the original document image information from said second input means is formed outside the region;

synthesizing means for synthesizing the image information from said first input means and the original document image information from said second input means in accordance with the mode selected by said selection means and the region information supplied from said third input means;

image forming means for forming an image on a selected sheet in accordance with image information supplied from said synthesizing means; and control means that inhibits an image forming operation of said image forming means when a size of an image represented by the image information supplied from said first input means and a size of the selected sheet do not coincide with each other in the first mode, and that permits said image forming means to start the image forming operation independent of a relationship between the image size of the image information supplied from said first input means and the size of the selected sheet in the second mode.

2. An image forming apparatus according to claim 1, wherein said third input means is a ten key.

3. An image forming apparatus according to claim 1, wherein said third input means is a digitizer.

4. An image forming apparatus according to claim 1, wherein said second input means is a scanner.

5. An image forming apparatus according to claim 1 further comprising display means for displaying an alarm, wherein said control means causes said display means to display said alarm if said control means inhibits start of said image forming operation.

6. An image processing method comprising the steps of:

inputting image information from a computer and original document image information from a scanner;

inputting region information indicating an image synthesizing region;

inputting an instruction to select one of a first mode in which the image information from the computer is formed outside the region and the original document image information from the scanner is formed inside the region, and a second mode in which the image information from the computer is formed inside the region and the original document image information from the scanner is formed outside the region; and inhibiting an image forming operation on a selected sheet when a size of an image represented by the image information supplied from said computer and a size of the selected sheet do not coincide with each other in the first mode, and permitting the image forming operation on the selected sheet by synthesizing the image information from said computer and the original document image information from the scanner independent of a relationship between the image size of the image information supplied from the computer and the size of the selected sheet in the second mode.

7. An image processing method according to claim 6, wherein an alarm is displayed when image forming is inhibited.

8. An image forming apparatus comprising:

first input means for inputting code information;

second input means for inputting image information;

third input means for inputting region information indicating a region in which images are synthesized;

selection means for selecting one of a first mode in which an image represented by the code information from said first input means is formed outside the region and an image represented by the image information from said second input means is formed inside the region, and a second mode in which an image represented by the code information from said first input means is formed inside the region and an image represented by the image information from said second input means is formed outside the region;

synthesizing means for synthesizing the code information from said first input means and the image information from said second input means in accordance with the mode selected by said selection means and the region information supplied from said third input means;

image forming means for forming an image on a selected sheet in accordance with image information supplied from said synthesizing means; and control means that inhibits an image forming operation of said image forming means when a size of an image represented by the code information supplied from said first input means and a size of the selected sheet do not coincide with each other in the first mode, and that permits said image forming means to start the image forming operation independent of a relationship between the image size of the code information supplied from said first input means and the size of the selected sheet in the second mode.

9. An image processing method comprising the steps of:

inputting code information from a first apparatus;

inputting image information from a second apparatus;

inputting region information indicating a region in which images are synthesized;

inputting an instruction to select one of a first mode in which an image represented by the code information from the first apparatus is formed outside the region and an image represented by the image information from the second apparatus is formed inside the region, and a second mode in which an image represented by the code information from the first apparatus is formed inside the region and an image represented by the image information from the second apparatus is formed outside the region;

inhibiting an image forming operation on a selected sheet when a size of an image represented by the code information supplied from the first apparatus and a size of the selected sheet do not coincide with each other in the first mode, and permitting the image forming operation on the selected sheet by synthesizing the code information from the first apparatus and the image information from the second apparatus independent of a relationship between the image size of the code information supplied from said first apparatus and the size of the selected sheet in the second mode.

10. An image processing method according to claim 9, wherein an alarm is displayed when image forming is inhibited.

11. An image forming apparatus comprising:

first input means for inputting image information from a computer;

second input means for inputting original document image information;

third input means for inputting region information indicating a region in which images are synthesized;

selection means for selecting one of a first mode in which the image information from said first input means is formed outside the region and the original document image information from said second input means is formed inside the region, and a second mode in which the image information from the first input means is formed inside the region and the original document image information from said second input means is formed outside the region;

synthesizing means for synthesizing the image information from said first input means and the original document image information from said second input means in accordance with the mode selected by said selection means and the region information supplied from said third input means;

image forming means for forming an image on a selected sheet in accordance with the image information supplied from said synthesizing means; and control means that inhibits an image forming operation of said image forming means when a size of an image represented by the image information supplied from said first input means and a size of the selected sheet do not coincide with each other in the first mode, and that permits said image forming means to start the image forming operation independent of a relationship between a size of the image represented by the original document image information supplied from said second input means and the size of the selected sheet in the second mode.

12. An image forming apparatus comprising:

first input means for inputting code information;

second input means for inputting image information;

third input means for inputting region information indicating a region in which images are synthesized;

selection means for selecting one of a first mode in which an image represented by the code information from said first input means is formed outside the region and an image represented by the image information from said second input means is formed inside the region, and a second mode in which an image represented by the code information from said first input means is formed inside the region and an image represented by the image information from said second input means is formed outside the region;

synthesizing means for synthesizing the code information from said first input means and the image information from said second input means in accordance with the mode selected by said selection means and the region information supplied from said third input means;

image forming means for forming an image on a sheet in accordance with the image information supplied from said synthesizing means; and control means that inhibits an image forming operation of said image forming means when a size of the image represented by the code information supplied from said first input means and a size of the selected sheet do not coincide with each other in the first mode, and that permits said image forming means to start the image forming operation independent of a relationship between a size of the image represented by the image information supplied from said second input means and the size of the selected sheet in the second mode.

13. An image processing method comprising the steps of:

inputting image information from a computer and original document image information from a scanner;

inputting region information indicating an image synthesizing region;

inputting an instruction to select one of a first mode in which the image information from the computer is formed outside the region and the original document image information from the scanner is formed inside the region, and a second mode in which the image information from the computer is formed inside the region and the original document image information from the scanner is formed outside the region; and inhibiting an image forming operation on a selected sheet when a size of an image represented by the image information supplied from the computer and a size of the selected sheet do not coincide with each other in the first mode, and permitting the image forming operation on the selected sheet by synthesizing the image information from the computer and the original document image information from the scanner independent of a relationship between the image size of the original document image information supplied from the scanner and the size of the selected sheet in the second mode.

14. An image processing method according to claim 13, wherein an alarm is displayed when image forming is inhibited.

15. An image processing method comprising the steps of:

inputting code information from a first apparatus;

inputting image information from a second apparatus;

inputting region information indicating a region in which images are synthesized;

inputting an instruction to select one of a first mode in which an image represented by the code information from the first apparatus is formed outside the region and an image represented by the image information from the second apparatus is formed inside the region, and a second mode in which an image represented by the code information from the first apparatus is formed inside the region and an image represented by the image information from the second apparatus is formed outside the region;

inhibiting an image forming operation on a selected sheet when a size of an image represented by the code information supplied from the first apparatus and a size of the selected sheet do not coincide with each other in the first mode, and permitting the image forming operation on the selected sheet by synthesizing the code information from the first apparatus and the image information from the second apparatus independent of a relationship between a size of the image represented by the image information supplied from the second apparatus and the size of the selected sheet in the second mode.

16. An image processing method according to claim 15, wherein an alarm is displayed when image forming is inhibited.

* * * * *

UNITED STATES PATENT AND TRADEMARK OFFICE
CERTIFICATE OF CORRECTION

PATENT NO. : 5,592,305
DATED : January 7, 1997
INVENTOR(S) : MASAHIRO IWADATE, ET AL.

It is certified that error appears in the above-indentified patent and that said Letters Patent is hereby corrected as shown below:

Title page
[57] ABSTRACT:

Line 1, "An" should read --A--.

COLUMN 2:

Line 20, "illustrates" should read --illustrate--;
Line 23, "illustrates" should read --illustrate--;
Line 26, "illustrates" should read --illustrate--;
Line 29, "illustrates" should read --illustrate--;
Line 32, "illustrates" should read --illustrate--;
Line 36, "illustrates" should read --illustrate--;
Line 39, "illustrates" should read --illustrate--;
Line 42, "illustrates" should read --illustrate--;
Line 45, "illustrates" should read --illustrate--; and
Line 48, "illustrates" should read --illustrate--.

COLUMN 7:

Line 55, "arbitrary" should read --arbitrarily--.

COLUMN 13:

Line 27, "claim 1" should read --claim 1,--.

COLUMN 14:

Line 42, "region;" should read --region; and--.

UNITED STATES PATENT AND TRADEMARK OFFICE
CERTIFICATE OF CORRECTION

PATENT NO. : 5,592,305
DATED : January 7, 1997
INVENTOR(S) : MASAHIRO IWADATE, ET AL.

It is certified that error appears in the above-indentified patent and that said Letters Patent is hereby corrected as shown below:

COLUMN 16:

Line 44, "region;" should read --region; and--.

Signed and Sealed this

First Day of July, 1997

Attest:

BRUCE LEHMAN

Attesting Officer

Commissioner of Patents and Trademarks